(12) United States Patent
Otsuka

(10) Patent No.: US 7,457,843 B2
(45) Date of Patent: Nov. 25, 2008

(54) IMAGE-TAKING CONTROL APPARATUS AND NOTIFICATION METHOD

(75) Inventor: Mitsuru Otsuka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 11/060,518

(22) Filed: Feb. 17, 2005

(65) Prior Publication Data

US 2005/0195837 A1 Sep. 8, 2005

(30) Foreign Application Priority Data

Feb. 20, 2004 (JP) ............................. 2004-045322
Jun. 4, 2004 (JP) ............................. 2004-167543

(51) Int. Cl.
*G06F 15/16* (2006.01)

(52) U.S. Cl. .................. 709/206; 709/217; 709/220; 709/229; 709/238

(58) Field of Classification Search ................ 709/203, 709/206, 208, 217, 220–222, 227–229, 238
See application file for complete search history.

(56) References Cited

U.S. PATENT DOCUMENTS

| | | | |
|---|---|---|---|
| 6,446,192 B1 * | 9/2002 | Narasimhan et al. | 709/203 |
| 2005/0041266 A1 * | 2/2005 | Silverbrook et al. | 709/206 |
| 2005/0196030 A1 * | 9/2005 | Schofield et al. | 709/203 |

* cited by examiner

*Primary Examiner*—Phuoc H Nguyen
(74) *Attorney, Agent, or Firm*—Morgan & Finnegan, LLP

(57) ABSTRACT

An image-taking control apparatus is provided which transmits an image taken by an image-taking device to a communication terminal via the Internet, including a settings memory, a control device, and a communication device.

12 Claims, 23 Drawing Sheets

FIG. 5

| SETTING INFORMATION | SETTING ITEM | SETTING VALUE |
|---|---|---|
| 501 NETWORK SETTINGS | IP ADDRESS | AUTOMATIC ACQUISITION |
| | | ASSIGN |
| | IP ADDRESS ASSIGNMENT | (IP ADDRESS) |
| | SUBNET MASK | (IP ADDRESS) |
| | GATEWAY | (IP ADDRESS) |
| | DNS SETTINGS | DO NOT USE |
| | | ASSIGNED BY SERVER |
| | | ASSIGN |
| | PRIMARY DNS | (IP ADDRESS) |
| | SECONDARY DNS | (IP ADDRESS) |
| 502 DIALUP SETTINGS | DIALUP CONNECTION DESTINATION | (TELEPHONE NUMBER OF CONNECTION DESTINATION) |
| | USER ID | (USER ID) |
| | USER PASSWORD | (PASSWORD) |
| 503 E-MAIL DELIVERY SETTINGS | SERVER NAME | (CHARACTER STRING OF SERVER NAME) |
| | SENDER | (E-MAIL ADDRESS OF SENDER) |
| | DELIVERY DESTINATION (MULTIPLE ENTRIES PERMITTED) | (E-MAIL ADDRESS) |
| | | |
| | | |

FIG. 6

| SETTING INFORMATION | SETTING ITEM | SETTING VALUE |
|---|---|---|
| 601 WEB SERVER SETTINGS | HOST NAME | (HOST NAME REGISTERED IN DNS SERVER) |
| | ACCESS AUTHENTICATION | NO |
| | | YES |
| | TIME SETTINGS | NO |
| | | YES |
| | TIME SETTINGS START TIME | (SETTING OF HOUR, MINUTE AND SECOND) |
| | TIME SETTINGS END TIME | (SETTING OF HOUR, MINUTE AND SECOND) |
| | SENSOR SETTINGS | NO |
| | | YES |
| | SENSOR SETTINGS OPERATING TIME | (SETTING OF MINUTES AND SECONDS) |

| SETTING INFORMATION | SETTING ITEM | SETTING VALUE |
|---|---|---|
| INCOMING CALL USER SETTINGS (2202) | TELEPHONE NUMBER (MULTIPLE ENTRIES PERMITTED) | (TELEPHONE NUMBER) |

2501: INCOMING CALL USER SETTINGS → TELEPHONE NUMBER ?    09012345678

2502: INCOMING CALL USER SETTINGS → TELEPHONE NUMBER ?    07087654321

2503: INCOMING CALL USER SETTINGS → TELEPHONE NUMBER ?

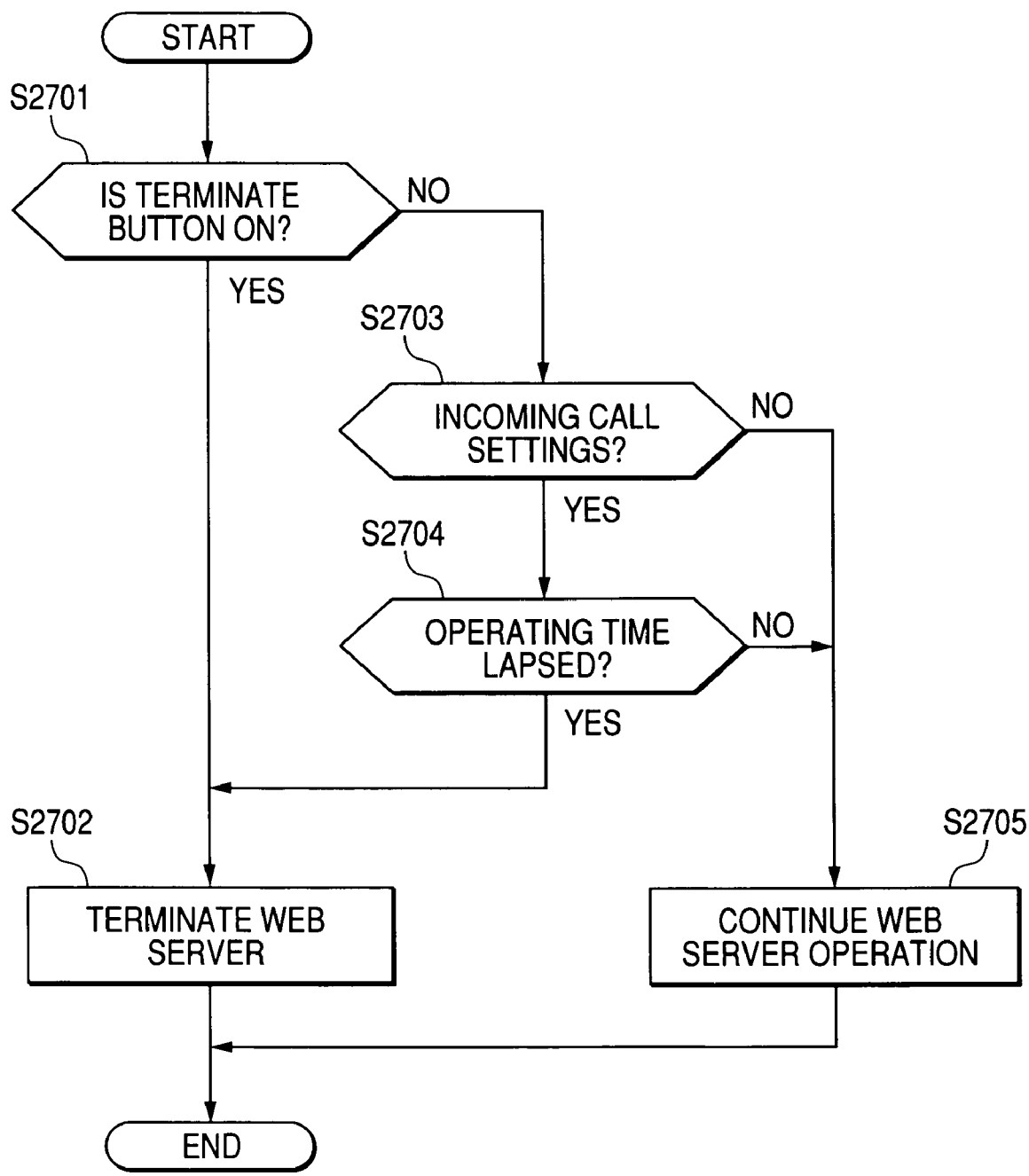

FIG. 26

| SETTING INFORMATION | SETTING ITEM | SETTING VALUE |
|---|---|---|
| 2801 INCOMING CALL USER SETTINGS | CALLING PARTY SUBADDRESS (MULTIPLE ENTRIES PERMITTED) | (SUBADDRESS VALUE) |
| 2802 INCOMING CALL USER SETTINGS | CALLED PARTY SUBADDRESS (MULTIPLE ENTRIES PERMITTED) | (SUBADDRESS VALUE) |
| 2803 INCOMING CALL USER SETTINGS | CALLING PARTY SUBADDRESS (MULTIPLE ENTRIES PERMITTED) | (SUBADDRESS VALUE) |
| | CALLED PARTY SUBADDRESS (MULTIPLE ENTRIES PERMITTED) | (SUBADDRESS VALUE) |
| 2804 INCOMING CALL USER SETTINGS | SUBADDRESS (MULTIPLE ENTRIES PERMITTED) | (SUBADDRESS VALUE) |

IMAGE-TAKING CONTROL APPARATUS AND NOTIFICATION METHOD

BACKGROUND OF THE INVENTION

1. Field of the Invention

The present invention relates to an image-taking control apparatus with a communication function and a notification method of the image-taking control apparatus.

2. Related Background Art

An image-taking control apparatus that has a function as a Web server for communicating with a client apparatus through a network is known. A system that uses an electronic mail to notify a receiving party of a URL for connecting to a Web server is also known.

In the above conventional art, a problem exists in that in a case where an image-taking control apparatus with a communication function has a Web server function to allow a communication terminal to connect to the image-taking control apparatus via a communications network to view images stored therein, when a communication terminal attempts to connect to the image-taking control apparatus it is not possible for the communication terminal to know whether or not the Web server function is activated before attempting the connection.

Another problem is that in order to ensure a connection from a communication terminal to a Web server of an image-taking control apparatus with a communication function, the Web server function must be activated at all times.

A further problem in the conventional art is that the Web server function is not built into the image-taking control apparatus, and it is thus not possible to carry out notification of activation and termination of the Web server function.

SUMMARY OF THE INVENTION

The present invention was made in view of the foregoing problems. An object of this invention is to solve various problems relating to communication connections between a communication terminal and a Web server of an image-taking control apparatus that has a communication function and a Web server function to thus provide an image-taking control apparatus that realizes a comfortable communication environment, as well as a notification method of the image-taking control apparatus.

To achieve at least one of the foregoing objects, one embodiment of this invention employs the configuration of An image-taking control apparatus for transmitting an image taken by an image-taking device to a communication terminal via the Internet, comprising: a settings memory for storing a preset address of a communication terminal, activation conditions for a function of a Web server for conducting communication with the communication terminal, and termination conditions for a function of the Web server; a control device for, in the case that the activation conditions are satisfied, activating the function of the Web server for conducting communication with the communication terminal, and creating contents of a first electronic mail which contains a message notifying a receiving party that the function of the Web server has been activated and a URL for accessing the image-taking control apparatus and is for transmission to the address of the communication terminal, transmitting a live image taken by the image-taking device to the communication terminal when it is recognized that the communication terminal accesses the image-taking control apparatus through the function of the Web server, and, when the termination conditions are satisfied, terminating the function of the Web server and creating contents of a second electronic mail which contains a message notifying a receiving party that the function of the Web server has been terminated and which is for transmission to the address of the communication terminal; and a communication device for transmitting the first electronic mail in response to activation of the function of the Web server, transmitting a live image taken by the image-taking device to the communication terminal in real time via the Internet in response to an access by the communication terminal, and transmitting the second electronic mail in response to termination of the function of the Web server.

Other objects and features of this invention will be apparent from the description below and the drawings.

BRIEF DESCRIPTION OF THE DRAWINGS

FIG. 5 is a view showing examples of setting information that is stored in a setting storage unit of an image-taking control apparatus according to an embodiment of this invention;

FIG. 6 is a view showing examples of setting information that is stored in a setting storage unit of an image-taking control apparatus according to an embodiment of this invention;

FIG. 25 is a flowchart that shows a decision to terminate a Web server in an operational algorithm of an image-taking control apparatus according to an embodiment of this invention;

FIG. 26 is a view showing examples of setting information that is stored in a setting storage unit of an image-taking control apparatus according to an embodiment of this invention.

DESCRIPTION OF THE PREFERRED EMBODIMENTS

One embodiment of this invention is described hereunder.

Figure 1:
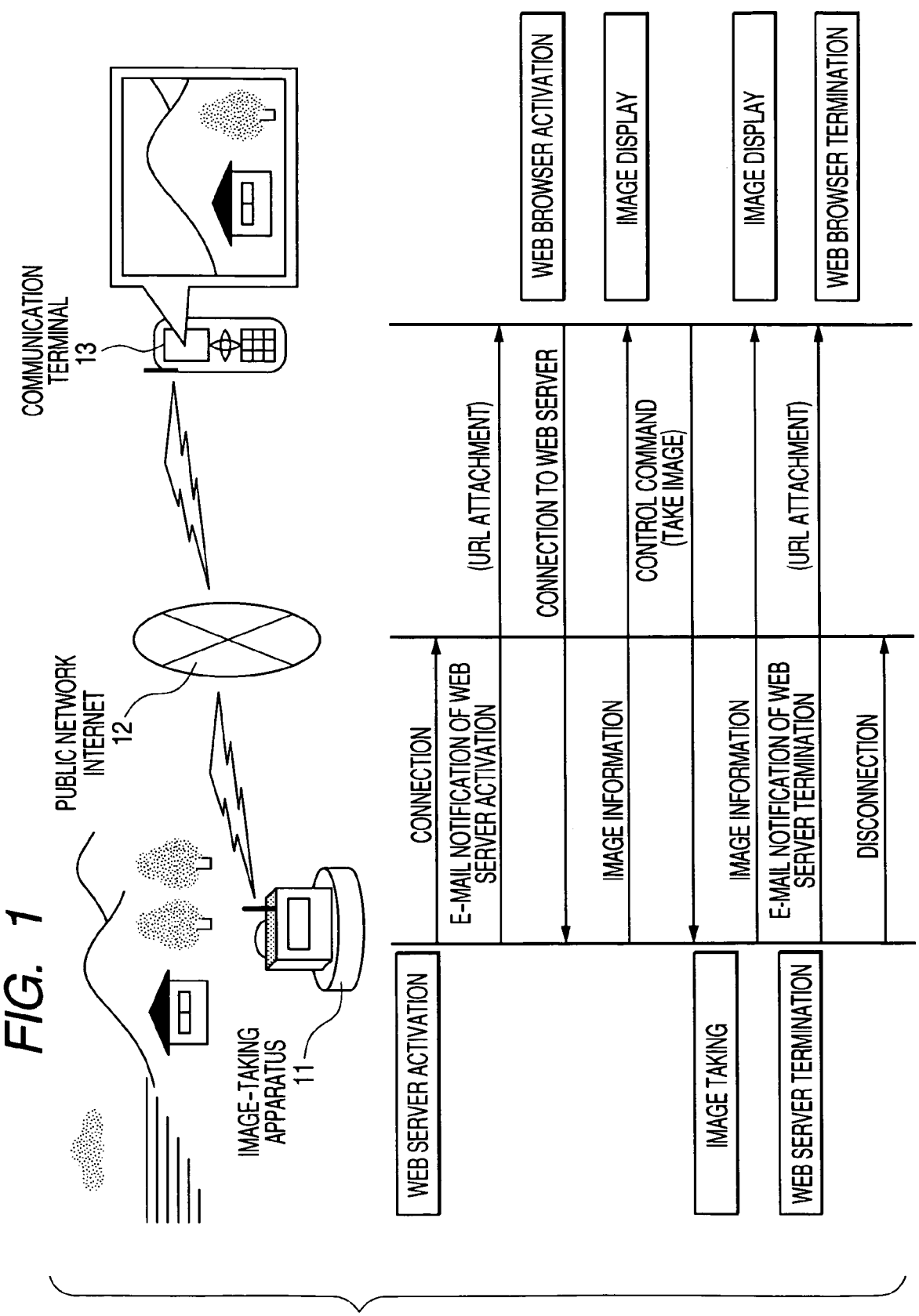
FIG. 1 is a view showing a configuration diagram of a system that includes an image-taking control apparatus according to an embodiment of this invention, as well as the sequence of operations thereof.

FIG. 1 is a view showing a configuration diagram of a system that includes an image-taking control apparatus according to the embodiment of this invention, as well as the sequence of operations thereof.

An image-taking control apparatus 11 in this embodiment has a communication function and a Web server function. When the Web server function is activated in this image-taking control apparatus 11, the image-taking control apparatus 11 connects to an Internet 12 through a public network, and an electronic mail that includes the URL of the Web server is transmitted to an electronic mail address of a communication terminal 13 that is stored in the image-taking control apparatus 11, and thus the communication terminal 13 is notified that the function of the Web server has been activated.

At the communication terminal 13 that received the electronic mail, a Web browser is activated when the URL that is included in the electronic mail is selected, to thereby connect the communication terminal 13 to the image-taking control apparatus. Thereafter, live dynamic image information of a low resolution that was captured by the image-taking control apparatus 11 is transmitted to the communication terminal 13 and displayed in the Web browser of the communication terminal 13. The live dynamic image information is also stored in a storage unit 207 of the image-taking control apparatus 11.

In this case, when an image viewing page provided by a Web server function contains an interface that transmits control commands, for example, a control command instructing the image-taking control apparatus 11 to take a high-definition still image with a camera is transmitted from the communication terminal 13 to the image-taking control apparatus 11, whereupon a still image is captured, and the information of the captured still image is then transmitted to the communication terminal 13 and displayed.

When terminating the Web server function at the image-taking control apparatus 11, an electronic mail is sent to the electronic mail address of the communication terminal 13 that is stored in the image-taking control apparatus 11 to notify the communication terminal 13 of termination of the Web server. In this case, when the user of the communication terminal that received the electronic mail is connected to the Web server, the user can terminate the Web browser.

Figure 2:
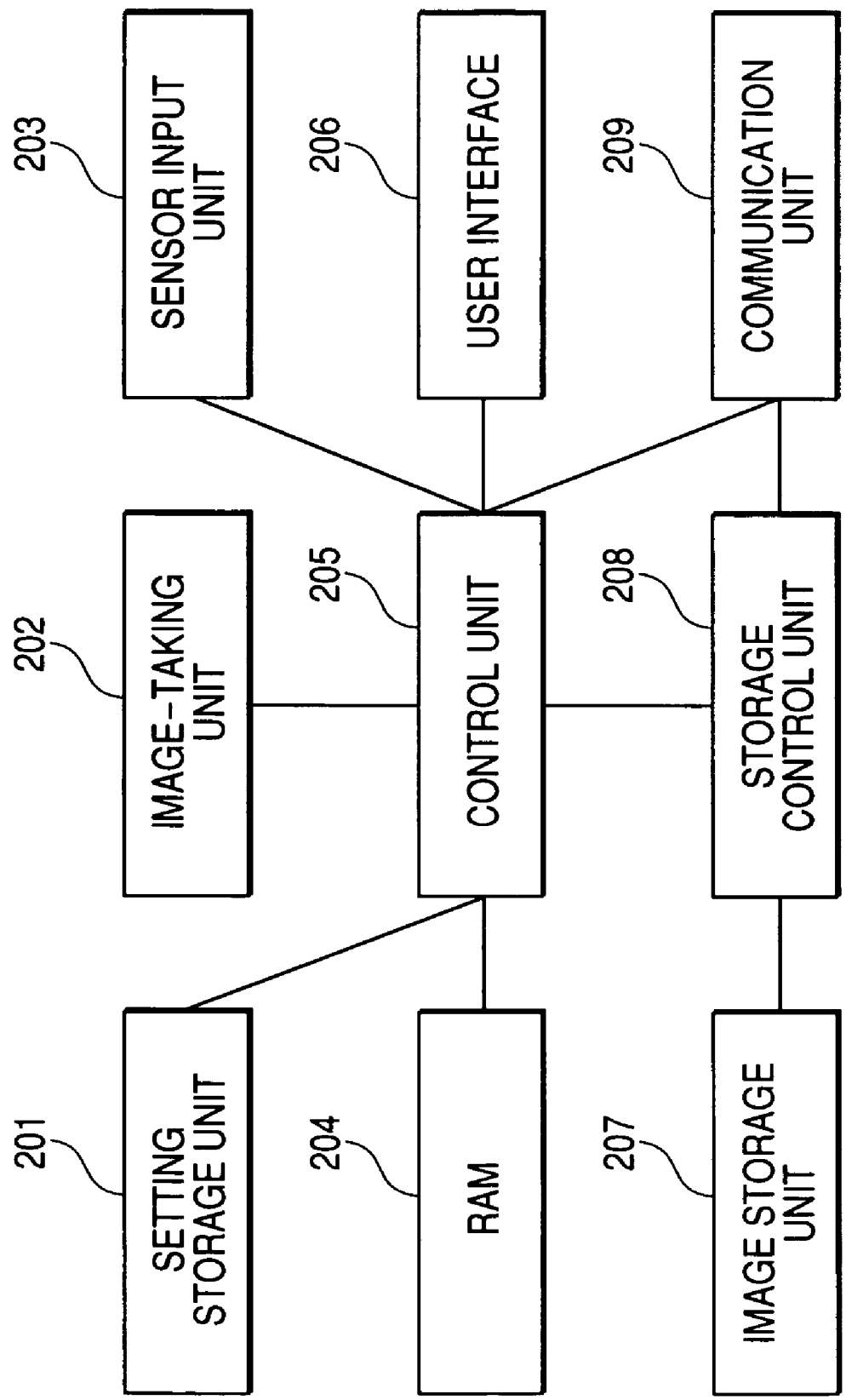
FIG. 2 is a block diagram showing the configuration of functions of an image-taking control apparatus according to an embodiment of this invention.

FIG. 2 is a block diagram showing the hardware configuration of the image-taking control apparatus 11.

The image-taking control apparatus 11 has a setting storage unit 201, an image-taking unit 202, a sensor input unit 203, a RAM 204, a control unit 205, a user interface 206, an image storage unit 207, a storage control unit 208, and a communication unit 209.

The setting storage unit 201 is a storage region that stores setting values used by operational algorithms of the image-taking control apparatus. The image-taking unit 202 takes images, and corresponds to a camera unit of the image-taking control apparatus 11. The sensor input unit 203 is connected to a sensor that acts as a trigger for operations of the image-taking control apparatus, and when the sensor enters an ON state, that information is transferred to the control unit 205. The RAM 204 is a temporary storage region in which an image that was taken by the image-taking unit 202 is stored to be used by an operational algorithm. The control unit 205 comprises a ROM in which are stored programs that execute operational algorithms of the image-taking control apparatus and a CPU that executes the operational algorithms. The control unit 205 controls the setting storage unit 201, the image-taking unit 202, the sensor input unit 203, the RAM 204, the user interface 206, the storage control unit 208 and the communication unit 209.

The user interface 206 provides an interface for entry of setting values by a user and detects instructions from a user to take a still image or activate the Web server. The image storage unit 207 stores captured image information in accordance with controls of the storage control unit 208. The storage control unit 208 causes captured image information to be stored in the image storage unit 207 in accordance with instructions of the control unit 205. The communication unit 209 connects with an electronic mail terminal or a server through a communications network and transmits captured image information in accordance with instructions of the control unit 205.

Figure 3:
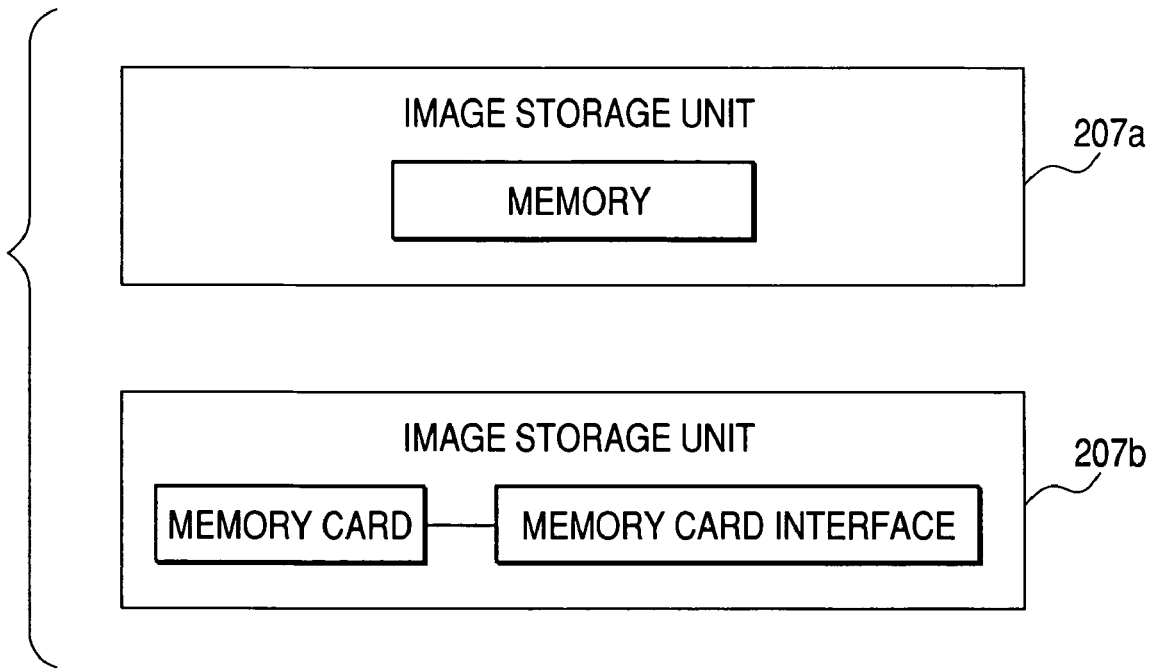
FIG. 3 is a view showing examples of the configuration of an image storage unit of an image-taking control apparatus according to an embodiment of this invention.

FIG. 3 is a view showing examples of the configuration of the image storage unit 207 of the image-taking control apparatus 11.

In the first example, an image storage unit 207a has a configuration that comprises an internal memory, and captured image information that is transferred from the storage control unit 208 in accordance with instructions of the control unit 205 is stored therein. Examples of the type of internal memory that can be used include a nonvolatile flash memory, a hard disk drive, or a rewritable optical disk drive.

In the second example, an image storage unit 207b has a configuration that comprises a memory card interface and a memory card. The memory card is a detachable storage medium, and the memory card is connected to the storage control unit 208 through the memory card interface to store captured image information. The storage control unit 208 detects mounting and removal of the memory card and causes captured image information to be stored in the memory card in accordance with instructions of the control unit 205.

Figure 4:
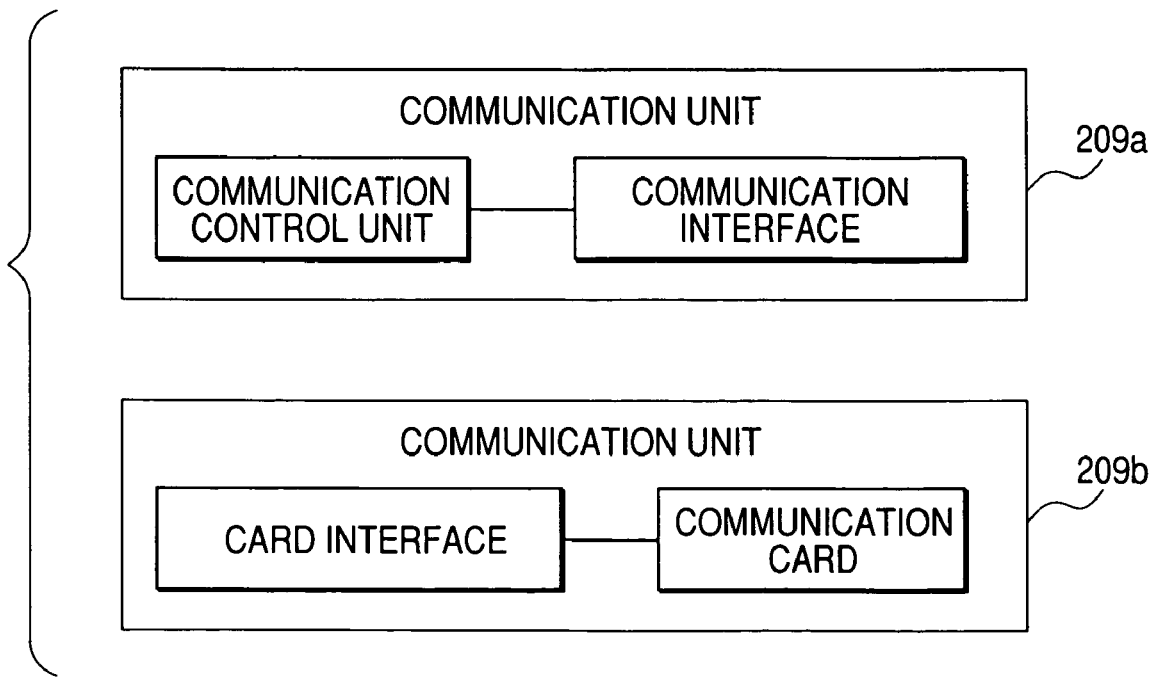
FIG. 4 is a view showing examples of the configuration of a communication unit of an image-taking control apparatus according to an embodiment of this invention.

FIG. 4 is a view showing examples of the configuration of the communication unit 209 of the image-taking control apparatus 11.

In the first example, a communication unit 209a has a configuration that comprises a communication control unit and a communication interface, in which the communication control unit controls communication via a communications network that is connected to through the communication interface.

In the second example, a communication unit 209b has a configuration that comprises a card interface and a communication card, in which a communication function of the image-taking control apparatus can be enabled or disabled by the mounting or removal of the communication card. The communication card contains functions that are equivalent to those of the communication control unit and communication interface of the communication unit 209a of the first example. As one example of the communication unit 209b, a combination of a Compact Flash (registered trademark) card (CF card) interface and a PHS card that is of a CF-card type may be mentioned.

A communication medium is not limited in this invention, and a communication medium such as an analog line, ISDN, wired LAN, wireless LAN, PDC, PHS, IMT-2000 and other communication media that conform to communications standards to be standardized hereafter can be used.

FIG. 5 and FIG. 6 are views showing examples of setting information that is stored in the setting storage unit 201 of the image-taking control apparatus 11. In this case, the setting information comprises setting items and setting values. This setting information comprises a "network settings" 501, a "dialup settings" 502, an "electronic mail delivery settings" 503 and a "Web server settings" 601. The setting items for the setting information of the "network settings" 501 are "IP address", "IP address assignment", "subnet mask", "gateway", "DNS settings", "primary DNS" and "secondary DNS".

In the setting items of the "network settings" 501, either "automatic acquisition" or "assign" is specified as the "IP address" setting value. As the setting value for "IP address assignment", the IP address value that is assigned when the setting value for "IP address" is "assign" is set.

As the setting value for "subnet mask", a subnet mask value is specified. As the setting value for "gateway", the value for the gateway IP address is set. As the setting value for "DNS settings", any one of "do not use", "assigned by server" and "assign" is specified. As the setting value for "primary DNS", the IP address value for the primary DNS is set. As the setting value for "secondary DNS", the IP address value for the secondary DNS is set.

In the setting items of the "dialup settings" 502, as the setting value for "dialup connection destination", the telephone number of the Internet service provider to be accessed by dialup connection in order to connect to the Internet is set. As the setting value for "user ID", a user ID to be entered when making a dialup connection is set. As the setting value for "password", a password to be entered when making a dialup connection is set.

In the setting items of the "electronic mail delivery settings" 503, as the setting value for "server name", a character string that shows the address of the electronic mail server is set. As the setting value for "sender", the electronic mail address that is specified for the sender of the electronic mail for delivery is set. As the setting value for "delivery destination", the electronic mail address that is specified for the destination for delivery of the electronic mail is set. It is possible to set a plurality of electronic mail addresses as delivery destinations.

In the setting items of the "Web server settings" 601 shown in FIG. 6, as the setting value of "host name", the host name that is registered in the DNS server is set. As the setting value for "access authentication", either "yes" or "no" is specified. This specifies whether or not to create a password authentication for access to the Web server. As the setting value for "time settings", either "yes" or "no" is specified. This specifies whether or not to implement a time control for activation/termination of the Web server. As the setting value for "time settings start time", when "yes" is specified as the value for "time settings", a value for the hour, minute and second of the time to activate the Web server is set. As the setting value for "time settings end time", when "yes" is specified as the value for "time settings", a value for the hour, minute and second of the time to terminate the Web server is set. As the setting value for "sensor settings", either "yes" or "no" is specified. This specifies whether or not to control activation/termination of the Web server by sensor input. In this case, as the setting value for "sensor settings operating time", when "yes" is specified as the value for "sensor settings", a value is set for the minutes and seconds of the time from activation of the Web server function until termination thereof.

The above-described setting information is set in advance by a user by entering setting values through a user interface 206 that is described hereunder in relation to FIG. 7, FIG. 8, FIG. 9 and FIG. 10.

Figure 7:
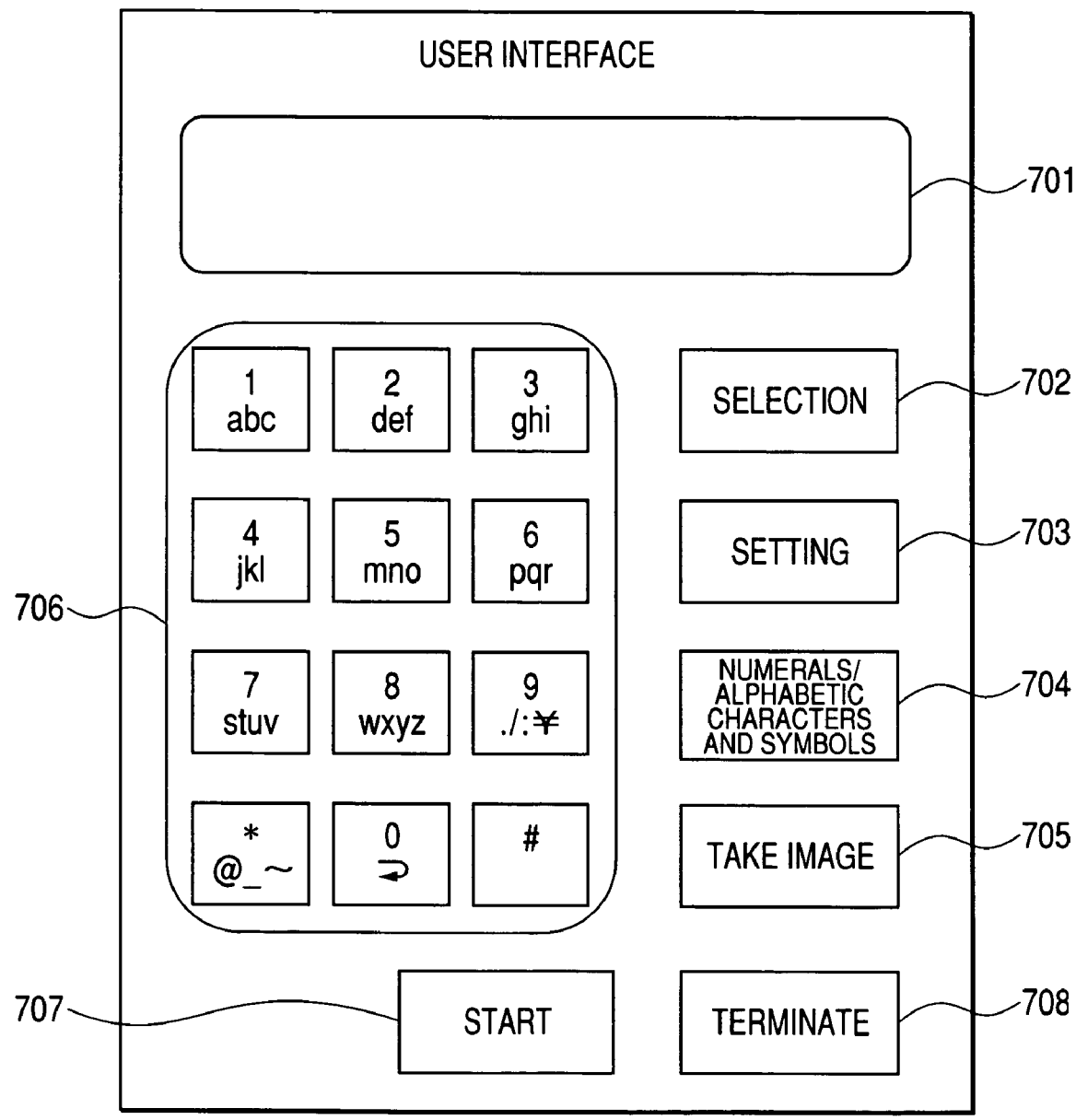
FIG. 7 is a view showing one example of a user interface of an image-taking control apparatus according to an embodiment of this invention.

FIG. 7 is a view showing one example of the user interface 206 of the image-taking control apparatus 11.

A display unit 701 provides an entry screen to a user when setting the setting information in the setting storage unit 201. A selection key 702 is used to select setting information, setting items and setting values when a user enters setting information. A setting key 703 is used when a user starts to enter setting information, confirms the selection of setting information, setting items and setting values, and confirms settings that were entered for a setting item. A numerals/alphabetic characters and symbols switching key 704 is used to switch between entry of numerals and entry of alphabetic characters and symbols when using entry keys for numerals, alphabetic characters and symbols 706 to enter characters. A take image key 705 is used when taking an image manually. When taking a dynamic image manually, image-taking begins when the take image key 705 is pressed, and the image-taking ends when the take image key 705 is pressed once more. Entry keys for numerals, alphabetic characters and symbols 706 are used to enter numerals, alphabetic characters and symbols. A start key 707 is used when manually activating the Web server. A terminate key 708 is used when manually terminating the Web server.

Figure 8:
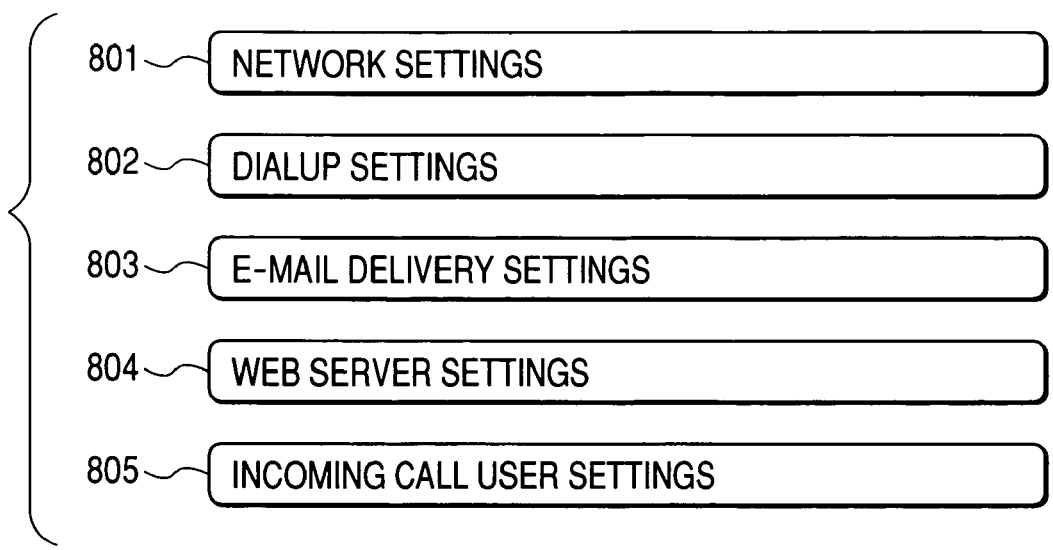
FIG. 8 is a view showing examples of a display that is displayed on a display unit when a user enters a setting value through a user interface of an image-taking control apparatus according to an embodiment of this invention.

FIG. 8 is a view showing examples of the display of a settings screen that is displayed on the display unit 701 when entering setting values for setting information through the user interface 206 of the image-taking control apparatus 11.

When the setting key 703 shown in FIG. 7 is pressed, the entry of settings can begin, and selection of the setting information is performed as the top menu. First, a "network settings" 801 is displayed, and subsequently, when the selection key 702 is pressed a "dialup settings" 802 is displayed.

Thereafter, by pressing the selection key 702, an "electronic mail delivery settings" 803, a "Web server settings" 804 and an "incoming call user settings" 805 are displayed in that order. When the selection key 702 is pressed again the display returns to the initial display that shows the "network settings" 801. When the setting key 703 is pressed while setting information for which the user wants to enter a setting value is displayed, the display shifts to a submenu for entering setting values for the selected setting information.

Figure 9:
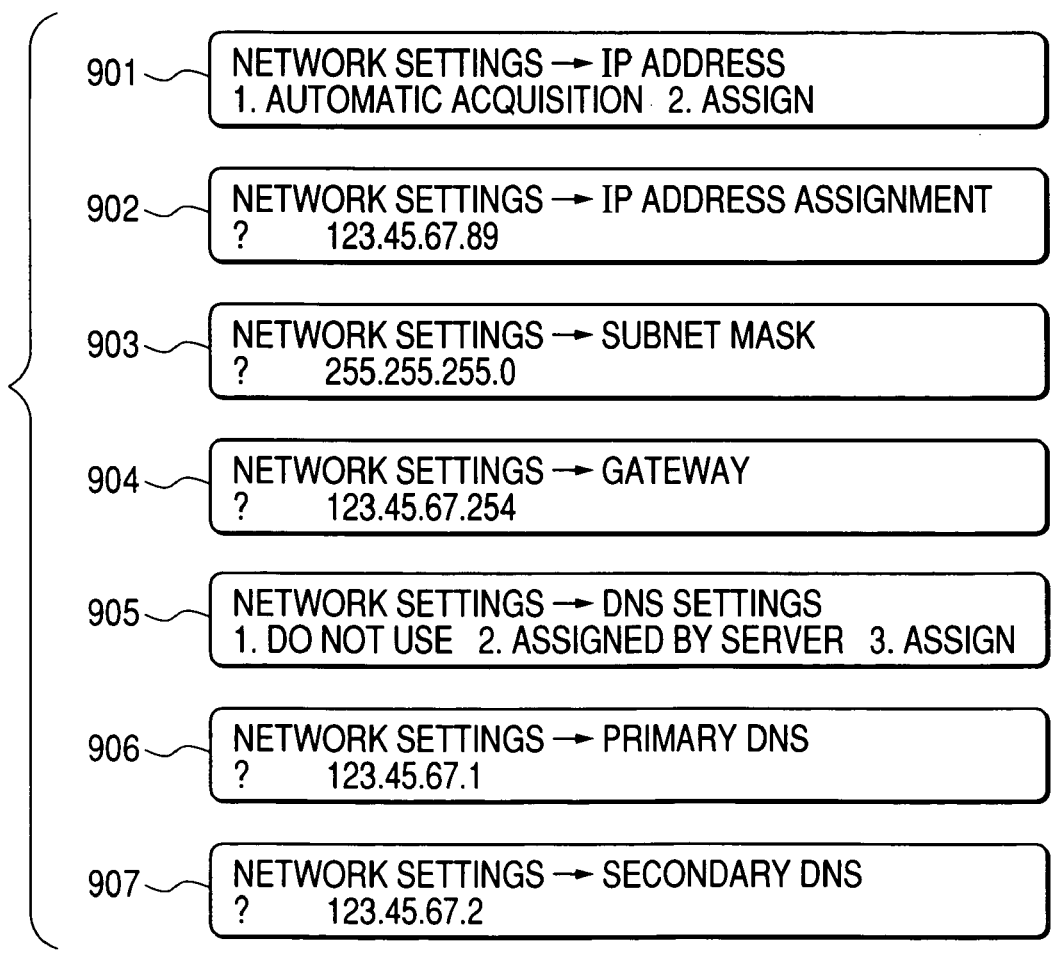
FIG. 9 is a view showing examples of a display that is displayed on a display unit when a user enters a setting value through a user interface of an image-taking control apparatus according to an embodiment of this invention.

FIG. 9 is a view showing examples of the display of a settings screen that is displayed on the display unit 701 when entering setting values for the setting information "network settings" through the user interface 206 of the image-taking control apparatus 11.

First, a settings screen 901 for "IP address" of the "network settings" is displayed to select "1. automatic acquisition" or "2. assign" using the selection key 702 or the entry keys for numerals, alphabetic characters and symbols 706, and the selected setting is set using the setting key 703. When "1. automatic acquisition" is set at this time, a settings screen 905 is displayed. When "2. assign" is set, a settings screen 902 is displayed.

In the settings screen 902, the setting for "IP address assignment" of the "network settings" is made by entering an IP address value using the entry keys for numerals, alphabetic characters and symbols 706 and then setting the entered value using the setting key 703. Next, a settings screen 903 is displayed.

In the settings screen 903, the setting for "subnet mask" of the "network settings" is made by entering a value for subnet mask using the entry keys for numerals, alphabetic characters and symbols 706 and then setting the entered value using the setting key 703. Next, a settings screen 904 is displayed.

In the settings screen 904, the setting for "gateway" of the "network settings" is made by entering a value for the gateway IP address using the entry keys for numerals, alphabetic characters and symbols 706 and then setting the entered value using the setting key 703. Next, the settings screen 905 is displayed.

In the settings screen 905, the setting for "DNS settings" of the "network settings" is made by selecting any one of "1. do not use", "2. assigned by server" and "3. assign" using the selection key 702 or the entry keys for numerals, alphabetic characters and symbols 706 and then setting the selected value item using the setting key 703. When "3. assign" has been set, a settings screen 906 is displayed. When a setting other than "3. assign" has been set, the setting of the "network settings" finishes and the display returns to the settings screen 801.

In the settings screen 906, the setting for "primary DNS" of the "network settings" is made by entering a value for the IP address of the primary DNS using the entry keys for numerals, alphabetic characters and symbols 706 and then setting the entered value using the setting key 703. Next, a settings screen 907 is displayed.

In the settings screen 907, the setting for "secondary DNS" of the "network settings" is made by entering a value for the IP address of the secondary DNS using the entry keys for numerals, alphabetic characters and symbols 706 and then setting the entered value using the setting key 703. Thus, the setting of the "network settings" finishes and the display returns to the settings screen 801.

Figure 10:
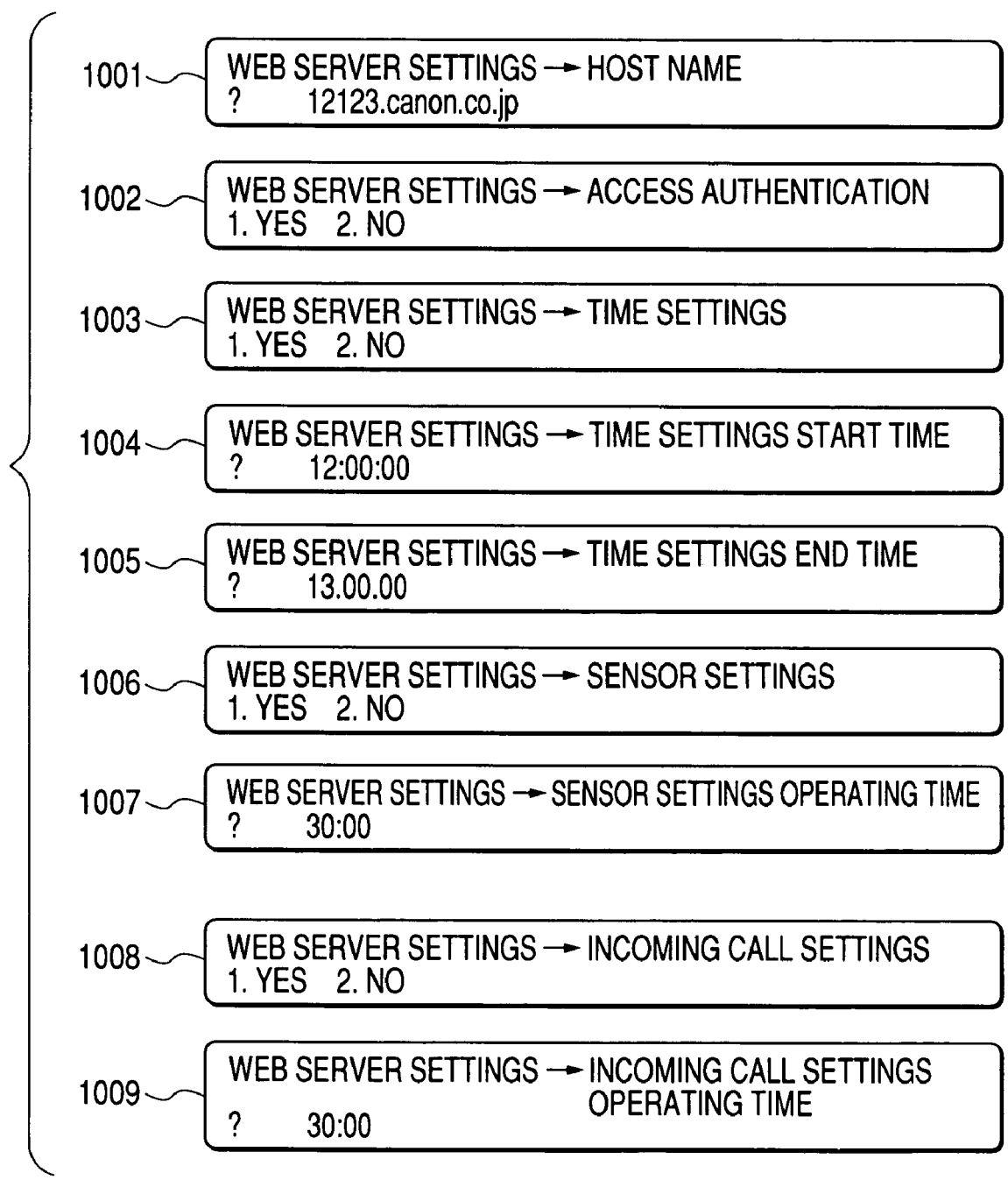
FIG. 10 is a view showing examples of a display that is displayed on a display unit when a user enters a setting value through a user interface of an image-taking control apparatus according to an embodiment of this invention.

FIG. 10 is a view showing examples of the display of a settings screen that is displayed on the display unit 701 when entering setting values for the setting information "Web server settings" through the user interface 206 of the image-taking control apparatus 11.

First, a settings screen 1001 for "host name" of the "Web server settings" is displayed to enter a character string for the host name using the entry keys for numerals, alphabetic characters and symbols 706, and the entered character string is then set using the setting key 703. Next, a settings screen 1002 is displayed.

In the settings screen 1002, the setting for "access authentication" of the "Web server settings" is made by selecting "1. yes" or "2. no" using the selection key 702 or the entry keys for numerals, alphabetic characters and symbols 706 and then setting the selected item using the setting key 703. Next, a settings screen 1003 is displayed.

In the settings screen 1003, the setting for "time settings" of the "Web server settings" is made by selecting "1. yes" or "2. no" using the selection key 702 or the entry keys for numerals, alphabetic characters and symbols 706 and then setting the selected item using the setting key 703. When "1. yes" has been set, a settings screen 1004 is displayed. When "2. no" has been set, a settings screen 1006 is displayed.

In the settings screen 1004, the setting for "time settings start time" of the "Web server settings" is made when "yes" has been set for "time settings" by entering a value for a time to activate the Web server using the entry keys for numerals, alphabetic characters and symbols 706 and then setting the entered value using the setting key 703. Next, a settings screen 1005 is displayed.

In the settings screen 1005, the setting for "time settings end time" of the "Web server settings" is made when "yes" has been set for "time settings" by entering a value for a time to terminate the Web server using the entry keys for numerals, alphabetic characters and symbols 706 and then setting the entered value using the setting key 703. Next, the settings screen 1006 is displayed.

In the settings screen 1006, the setting for "sensor settings" of the "Web server settings" is made by selecting "1. yes" or "2. no" using the selection key 702 or the entry keys for numerals, alphabetic characters and symbols 706 and then setting the selected item using the setting key 703. When "1. yes" has been set, a settings screen 1007 is displayed. When "2. no" has been set, the setting of the "Web server settings" finishes and the display returns to the settings screen 804.

In the settings screen 1007, the setting for "sensor settings operating time" of the "Web server settings" is made by using the entry keys for numerals, alphabetic characters and symbols 706 to enter a value for the operating time of the Web server when the Web server is activated by sensor input, and then setting the entered value using the setting key 703. The setting of the "Web server settings" thus finishes and the display returns to the settings screen 804.

In the settings screen 1008, the setting for "incoming call settings" of the "Web server settings" is made by selecting "1. yes" or "2. no" using the selection key 702 or the entry keys for numerals, alphabetic characters and symbols 706 and then setting the selected item using the setting key 703. When "1. yes" has been set, a settings screen 1009 is displayed. When "2. no" has been set, the setting of the "Web server settings" finishes and the display returns to the settings screen 804.

In the settings screen 1009, the setting for "incoming call settings operating time" of the "Web server settings" is made by using the entry keys for numerals, alphabetic characters and symbols 706 to enter a value for the operating time of the Web server when an incoming call from the communication terminal 13 is employed as a trigger to activate the Web server, and then setting the entered value using the setting key 703. Thus, the setting of the "Web server settings" finishes and the display returns to the settings screen 804.

The setting values for the other setting information, i.e. "dialup settings" and "electronic mail delivery settings", are also entered through the display of settings screens in the same manner as in FIG. 9 and FIG. 10. The necessary setting information can be entered using the user interface 206, as described in the foregoing by taking the setting information described in FIG. 8, FIG. 9 and FIG. 10 as one example.

FIGS. 11, 12, 13, 15, 18 and 19 are flowcharts showing operational algorithms of the image-taking control apparatus 11 that are executed by the control unit 205. Hereunder, the operation of the image-taking control apparatus is described in accordance with the flowcharts.

Figure 11:
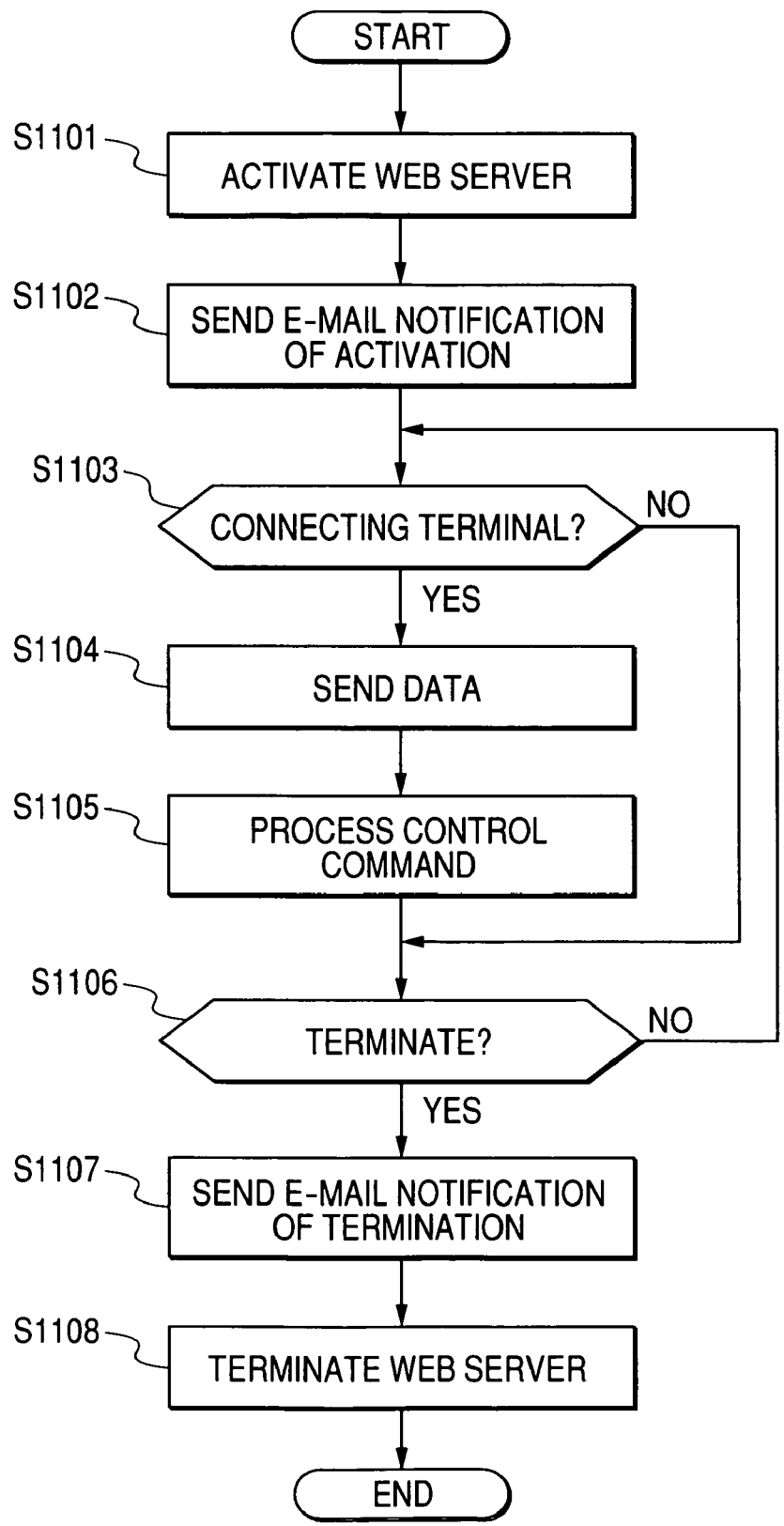
FIG. 11 is a flowchart that shows an operational algorithm of an image-taking control apparatus according to an embodiment of this invention.

FIG. 11 shows an operational algorithm of the image-taking control apparatus 11.

In step S1101, the control unit 205 activates the function of the Web server. The details of the processing performed in step S1101 are described later referring to FIG. 12.

Next, in step S1102, the control unit 205 notifies the communication terminal 13 that the function of the Web server has been activated. The details of the processing performed in step S1102 are described later referring to FIG. 13.

Thereafter, in step S1103, the control unit 205 determines whether or not a communication terminal is connected to the Web server of the image-taking control apparatus. When a communication terminal is connected to the Web server the operation proceeds to step S1104, and when a communication terminal is not connected to the Web server the operation proceeds to step S1106, and the processing is continued.

In step S1104, the control unit 205 carries out data transmission between the image-taking control apparatus of the Web server and the communication terminal 13 that is connected to the Web server. The details of the processing performed in step S1104 are described later referring to FIG. 15.

Subsequently, in step S1105, the control unit 205 processes a control command that has been sent from the communication terminal 13 to the Web server. The details of the processing performed in step S1105 are described later referring to FIG. 17.

Next, in step S1106, the control unit 205 decides whether or not to terminate the function of the Web server of the image-taking control apparatus 11. The details of the processing performed in step S1106 are described later referring to FIG. 18.

Figure 20:
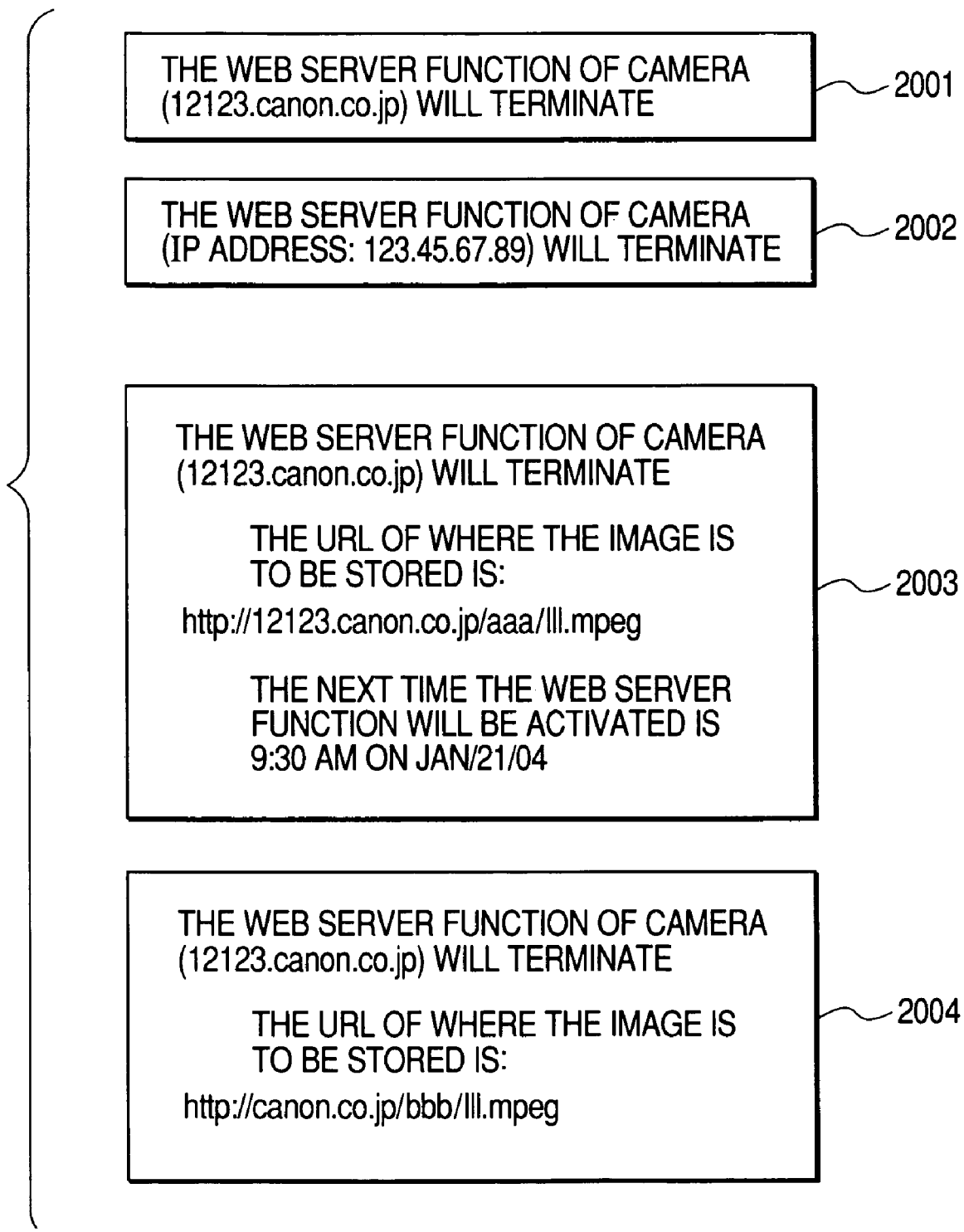
FIG. 20 is a view showing examples of an electronic mail to notify a receiving party of termination of a Web server function of an image-taking control apparatus according to an embodiment of this invention.

Thereafter, in step S1107, the control unit 205 notifies the communication terminal 13 by electronic mail that the Web server function will be terminated. FIG. 20 is a view showing examples of the text of an electronic mail to notify the communication terminal that the Web server function will be terminated. In FIG. 20, an electronic mail text 2001 is an example for a case in which the "host name" of the "Web server settings" 601 has been set, which enables the receiving party to confirm by means of the host name, which image-taking control apparatus 11 will have its Web server function terminated. In the same figure, an electronic mail text 2002 is an example that notifies the receiving party of the IP address of the image-taking control apparatus 11 that will have its Web server function terminated.

Next, in step S1108, the function of the Web server is terminated.

Figure 12:
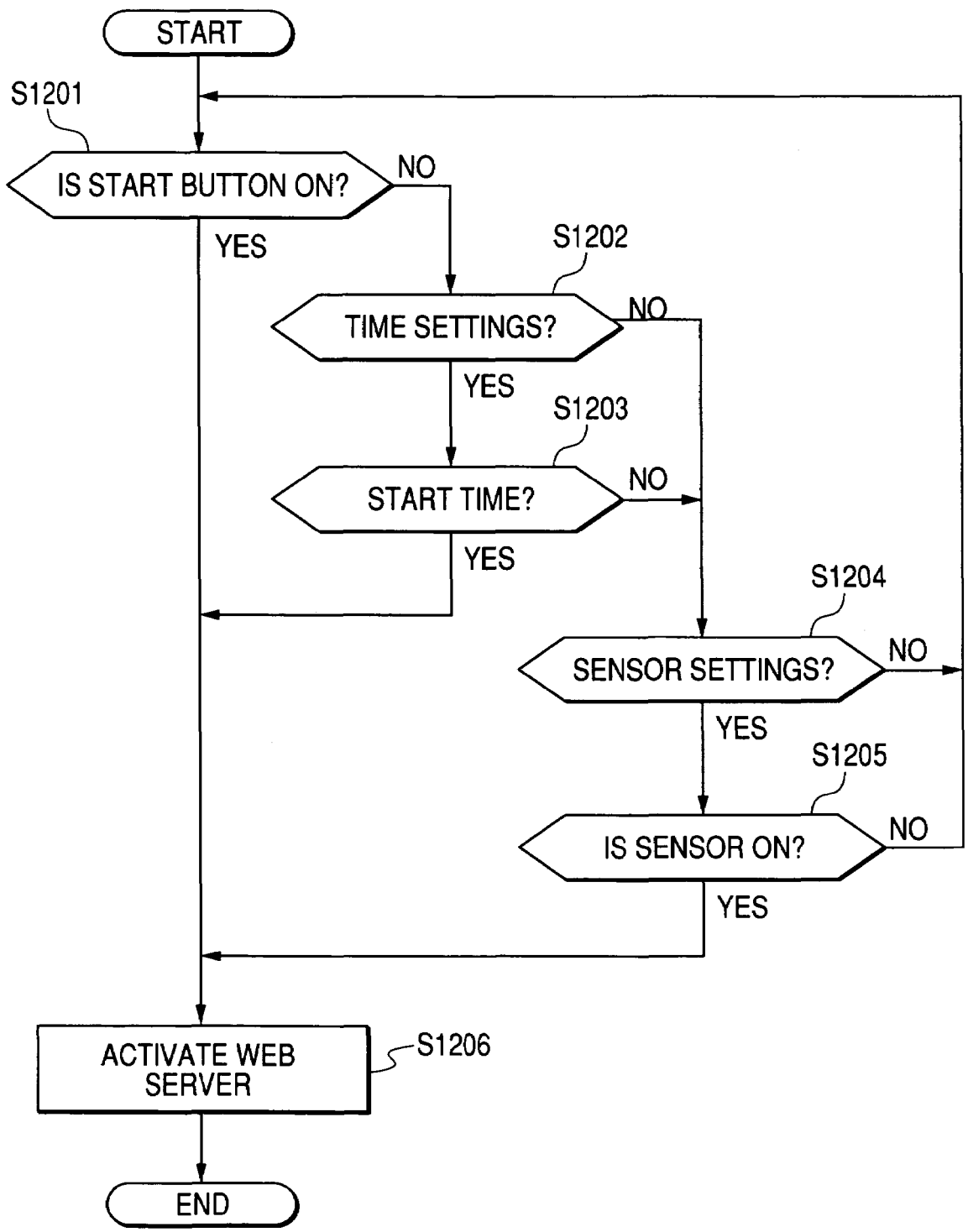
FIG. 12 is a flowchart showing activation of a Web server in an operational algorithm of an image-taking control apparatus according to an embodiment of this invention.

FIG. 12 is a flowchart that shows activation of the Web server function in an operational algorithm of the image-taking control apparatus 11. This flowchart corresponds with the step S1101 of FIG. 11.

First, in step S1201, the control unit 205 determines whether or not a start button 707 of the user interface 206 was pressed. When the control unit 205 determines that the start button was pressed the operation proceeds to step S1206, and when it determines that the start button was not pressed the operation proceeds to step S1202, and processing is continued.

Next, in step S1202, the control unit 205 determines whether or not "yes" has been set in the "time settings" of the "Web server settings" 601 of the setting information. When "yes" has been set in the "time settings" the operation proceeds to step S1203, and when "no" has been set in the "time settings" the operation proceeds to step S1204, and processing is continued.

Subsequently, in step S1203, the control unit 205 determines whether or not the current time is the time set in "time settings start time" of the "Web server settings" 601. When the control unit 205 determines that the current time is the time set in "time settings start time" the operation proceeds to step S1206, and when it determines that the current time is not the time set in "time settings start time" the operation proceeds to step S1204, and processing is continued.

In step S1204, the control unit 205 determines whether or not "yes" has been set in the "sensor settings" of the "Web server settings" 601 of the setting information. When "yes" has been set in the "sensor settings" the operation proceeds to step S1205, and when "no" has been set in the "sensor settings" the operation proceeds to step S1201, and processing is continued.

Next, in step S1205, the control unit 205 determines whether or not there is a sensor input in the sensor input unit 203. When there is a sensor input, after the current time is stored in order to determine when the "sensor settings operating time" of the "Web server settings" 601 lapses, the operation proceeds to step S1206, and when there is no sensor input the operation proceeds to step S1201, and processing is continued.

In step S1206, the Web server function is activated to enable access from the communication terminal 13 by means of a function of the Web browser of the communication terminal 13 through the public network and the Internet.

Figure 13:
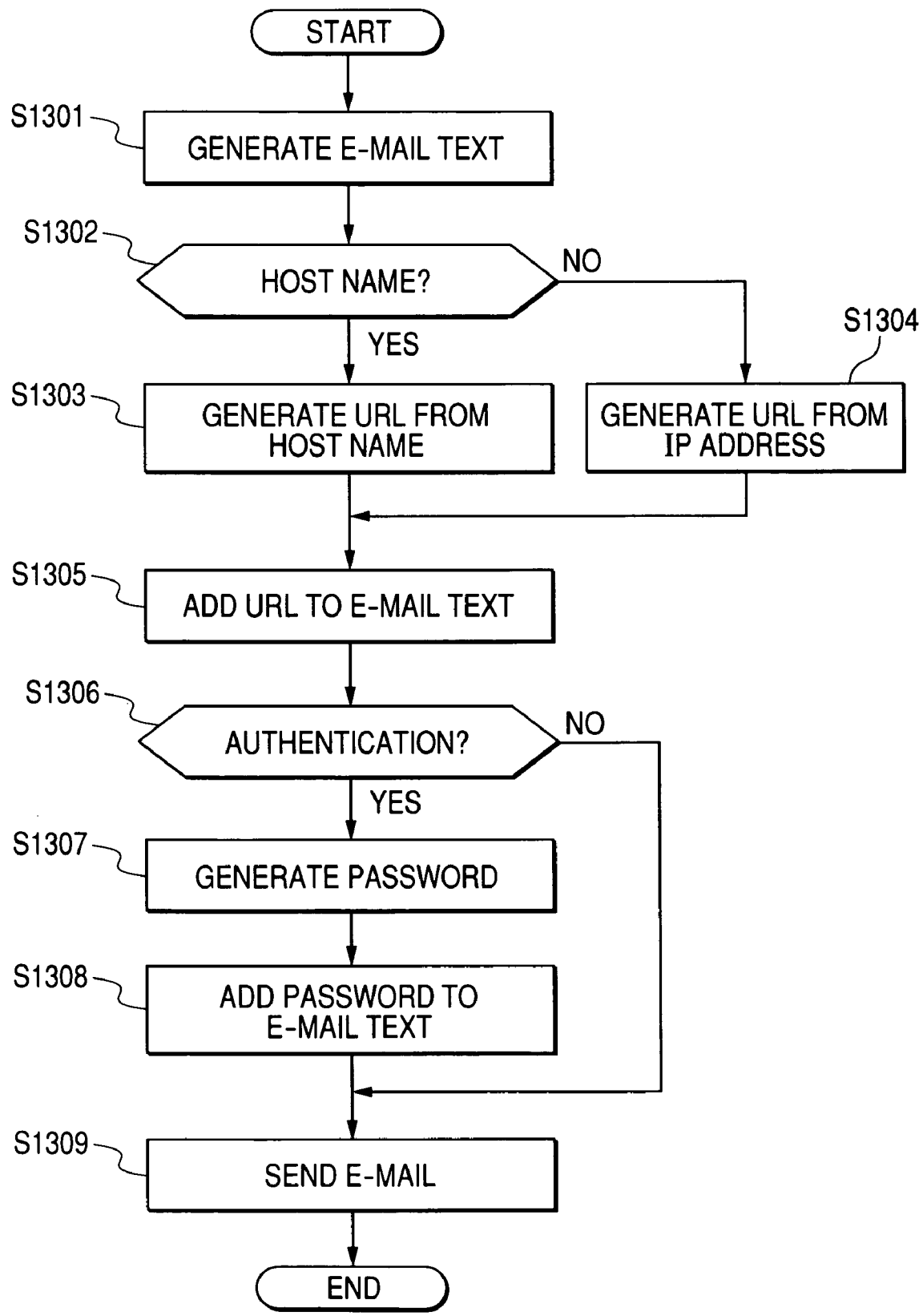
FIG. 13 is a flowchart showing transmission of an electronic mail to notify a receiving party of activation of a Web server in an operational algorithm of an image-taking control apparatus according to an embodiment of this invention.

FIG. 13 is a flowchart that shows transmission of an electronic mail to notify a receiving party of activation of a Web server function in an operational algorithm of the image-taking control apparatus 11. This flowchart corresponds with the step S1102 of FIG. 11.

Figure 14:
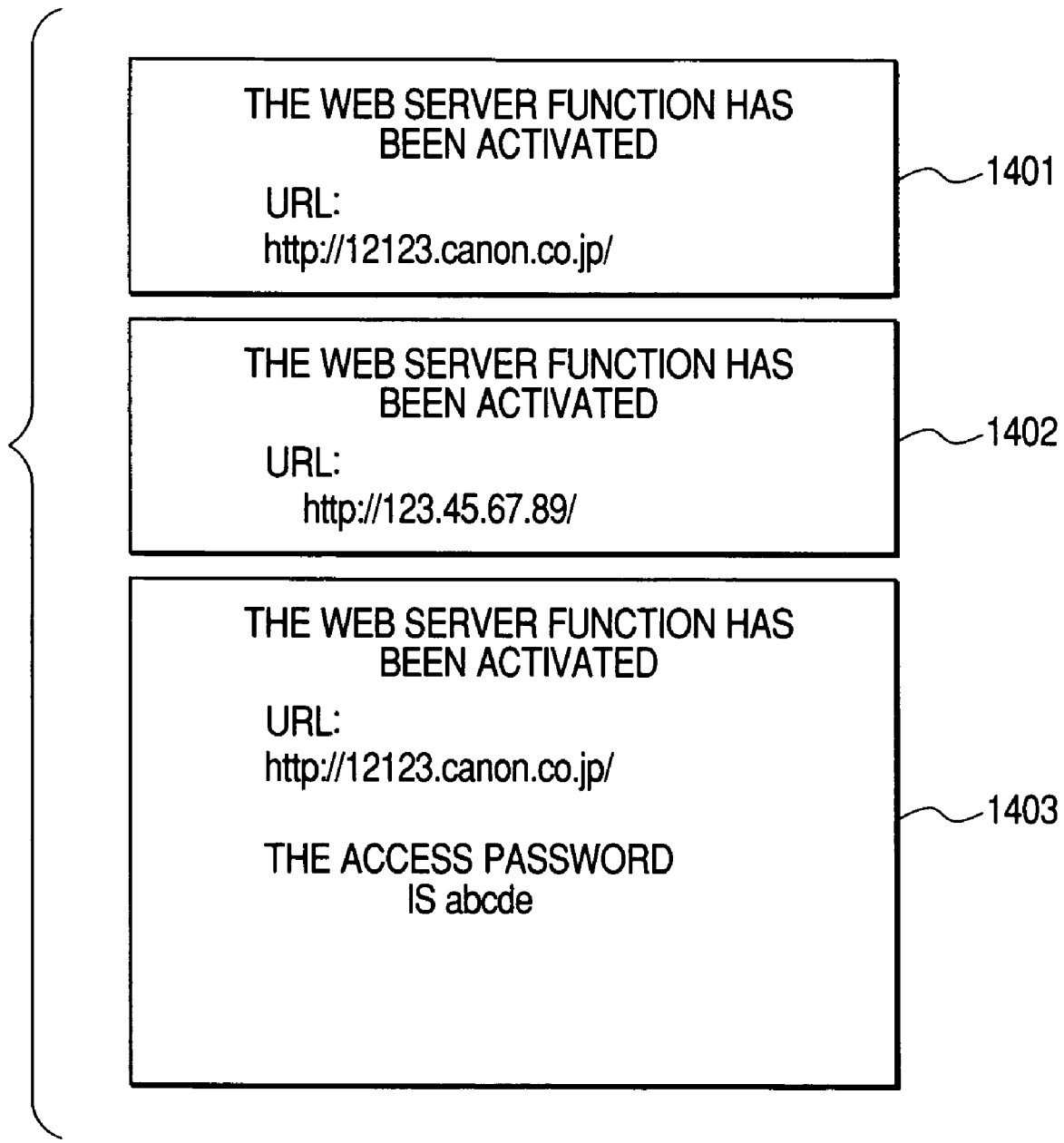
FIG. 14 is a view showing examples of an electronic mail to notify a receiving party of activation of the Web server in an image-taking control apparatus according to an embodiment of this invention.

First, in step S1301, the control unit 205 generates text for an electronic mail to notify a receiving party that the Web server function has been activated. Examples of the text of the electronic mail are shown in FIG. 14. In the examples shown in FIG. 14, a sentence "The Web server function is activated" is generated.

Next, in step S1302, the control unit 205 determines whether or not a setting has been made for "host name" of the "Web server settings" 601 of the setting information. When the "host name" has been set the operation proceeds to step S1303, and when the "host name" has not been set the operation proceeds to step S1304, and processing is continued.

Thereafter, in step S1303, the control unit 205 generates a URL from the "host name". In the example of FIG. 14, when "12123.canon.co.jp" is set in the "host name", the URL "http://12123.canon.co.jp/" is generated as shown in an electronic mail text 1401.

In step S1304, the control unit 205 generates a URL from an IP address that was automatically acquired or assigned in the "network settings" 501. In the example of FIG. 14, when the IP address is "123.45.67.89", the URL "http://123.45.67.89" is generated as shown in an electronic mail text 1402.

Next, in step S1305, the control unit 205 adds the URL that was generated in step S1303 or step S1304 to the electronic mail text.

Thereafter, in step S1306, the control unit 205 determines whether or not "yes" is set for "access authentication" of the "Web server settings" 601. When "yes" is set for "access authentication" the operation proceeds to step S1307, and when "no" is set for "access authentication" the operation proceeds to step S1309, and processing is continued.

Next, in step S1307, the control unit 205 generates a password for access authentication to enable access to the Web server.

Subsequently, in step S1308, the control unit 205 adds the thus-generated password for access authentication to the electronic mail text. In the example of FIG. 14, a password character string "abcde" is generated and added to the electronic mail text, as shown in the example 1403.

Next, in step S1309, the control unit 205 sends the generated electronic mail to the communication terminal 13.

Figure 15:
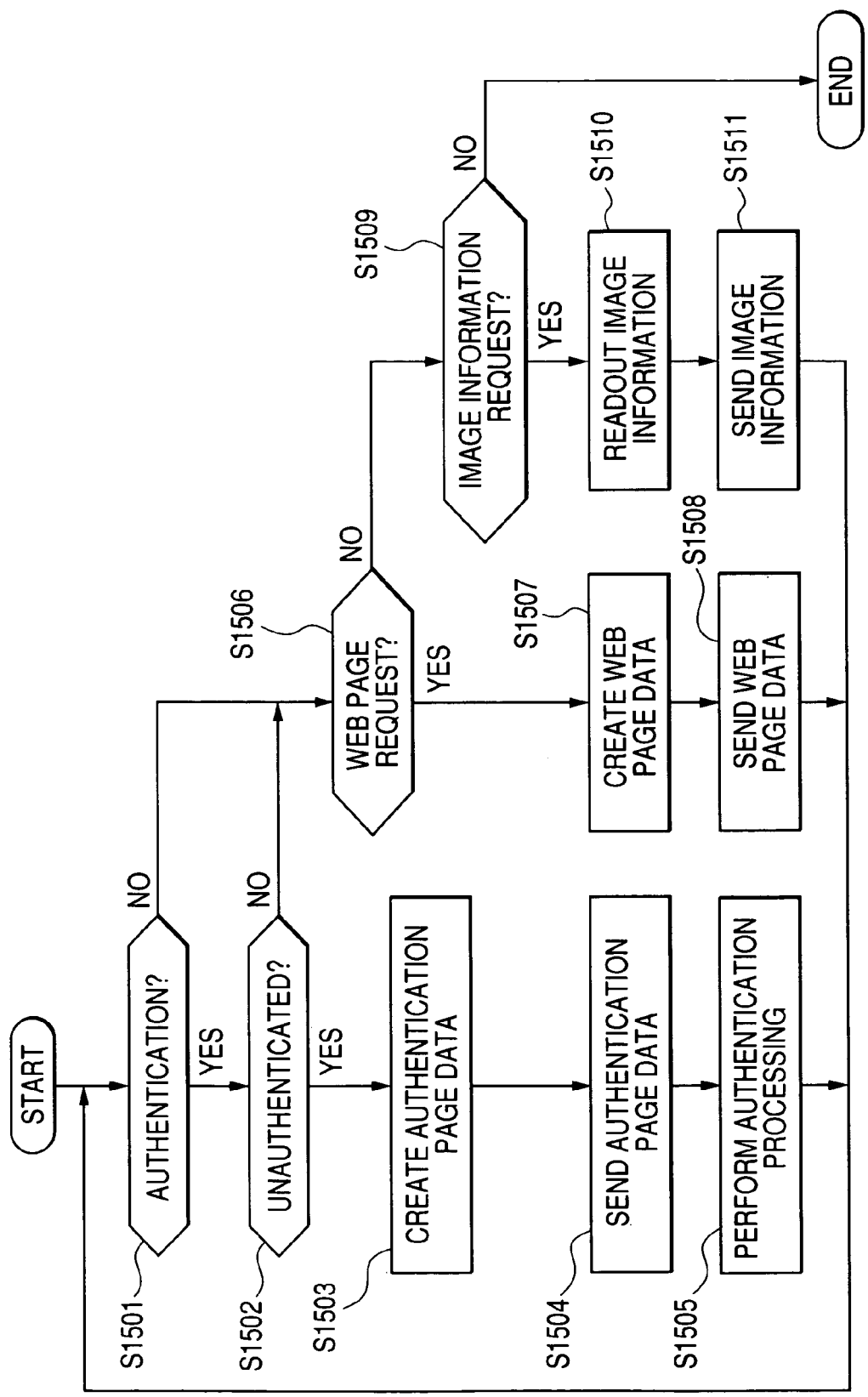
FIG. 15 is a flowchart showing transmission of data in an operational algorithm of an image-taking control apparatus according to an embodiment of this invention.

FIG. 15 is a flowchart that shows data transmission in an operational algorithm of the image-taking control apparatus 11. This flowchart corresponds with the step S1104 of FIG. 11.

First, in step S1501, the control unit 205 determines whether or not "yes" is set for "access authentication" of the "Web server settings" 601. When "yes" is set for "access authentication" the operation proceeds to step S1502, and when "no" is set for "access authentication" the operation proceeds to step S1506, and processing is continued.

Subsequently, in step S1502, the control unit 205 determines whether or not the communication terminal connected to the Web server is unauthenticated. When the communication terminal is unauthenticated the operation proceeds to step S1503, and when the communication terminal is authenticated the operation proceeds to step S1506, and processing is continued.

Thereafter, in step S1503, the control unit 205 generates data for an authentication page to allow the user of the communication terminal 13 to enter a password for access authentication.

Figure 16:
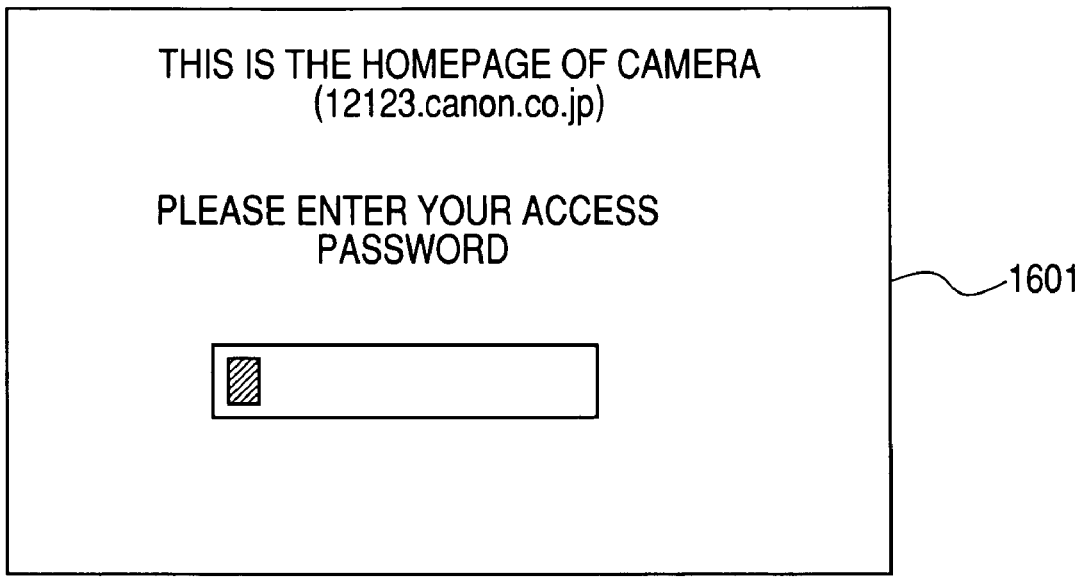
FIG. 16 is a view showing an example of an authentication page that is displayed when carrying out access authentication with a Web browser on a communication terminal connected to a Web server operating at an image-taking control apparatus according to an embodiment of this invention.

Next, in step S1504, the control unit 205 transmits the authentication page data that was generated in step S1503 to the communication terminal 13. The authentication page data is displayed in the Web browser on the communication terminal 13. FIG. 16 shows an example 1601 of an authentication page that is displayed in a display unit of the communication terminal 13. A cursor for entering a password for access authentication is displayed in the display unit.

In step S1505, the control unit 205 carries out access authentication processing. In the example shown in FIG. 16, when the user of the communication terminal 13 enters the password described in the text of the electronic mail that notified the user that the Web server function was activated, the thus-entered password is transmitted to the image-taking control apparatus 11 to undergo authentication by the control unit 205.

In step S1506, the control unit 205 determines whether or not there is a request for a Web page from the communication terminal 13. When a Web page is being requested the operation proceeds to step S1507, and when a Web page is not being requested the operation proceeds to step S1509, and processing is continued.

In step S1507, the control unit 205 generates data for the Web page, and in step S1508 the control unit 205 transmits the Web page data to the communication terminal 13. In step S1509, the control unit 205 determines whether or not there is a request for image information from the communication terminal 13. When image information is being requested the operation proceeds to step S1510 and processing is continued, and when image information is not being requested the processing is terminated.

Figure 17:
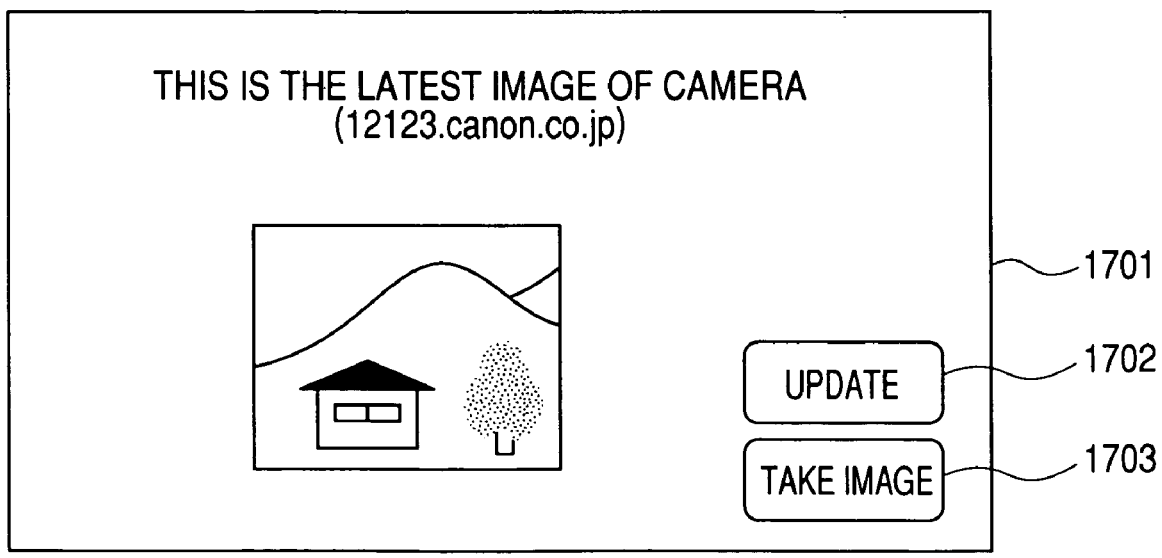
FIG. 17 is a view showing an example of a page that displays image information that was sent from a Web server operating at an image-taking control apparatus according to an embodiment of this invention to a communication terminal and provides an interface for entry of commands for image-taking.

In step S1510, image information is readout from the image storage unit 207. Thereafter, in step S1511, the image information is transmitted to the communication terminal to display an image in the Web browser of the communication terminal that received the image information. FIG. 17 shows an example of the image displayed in the Web browser of the communication terminal. In the case of the image display example that is shown in FIG. 17, the user can send a request for image information to the image-taking control apparatus by operating the user interface of the Web browser of the communication terminal. A Web browser screen 1701 has an update button 1702, and the user of the communication terminal operates the update button 1702 by use of a pointing device or a key that is assigned to a take image button. When the update button 1702 is put into an ON state, a request to transmit the latest image information that is stored in the image-taking control apparatus is sent to the image-taking control apparatus.

The image display example shown in FIG. 17 is one example of the display, and the design of a screen is not limited to that shown in FIG. 17. Also, a user can send a Web page request or, when script is described that displays an image on the page, an image information request, to the image-taking control apparatus by operating an update button that is provided as standard on a Web browser.

Figure 18:
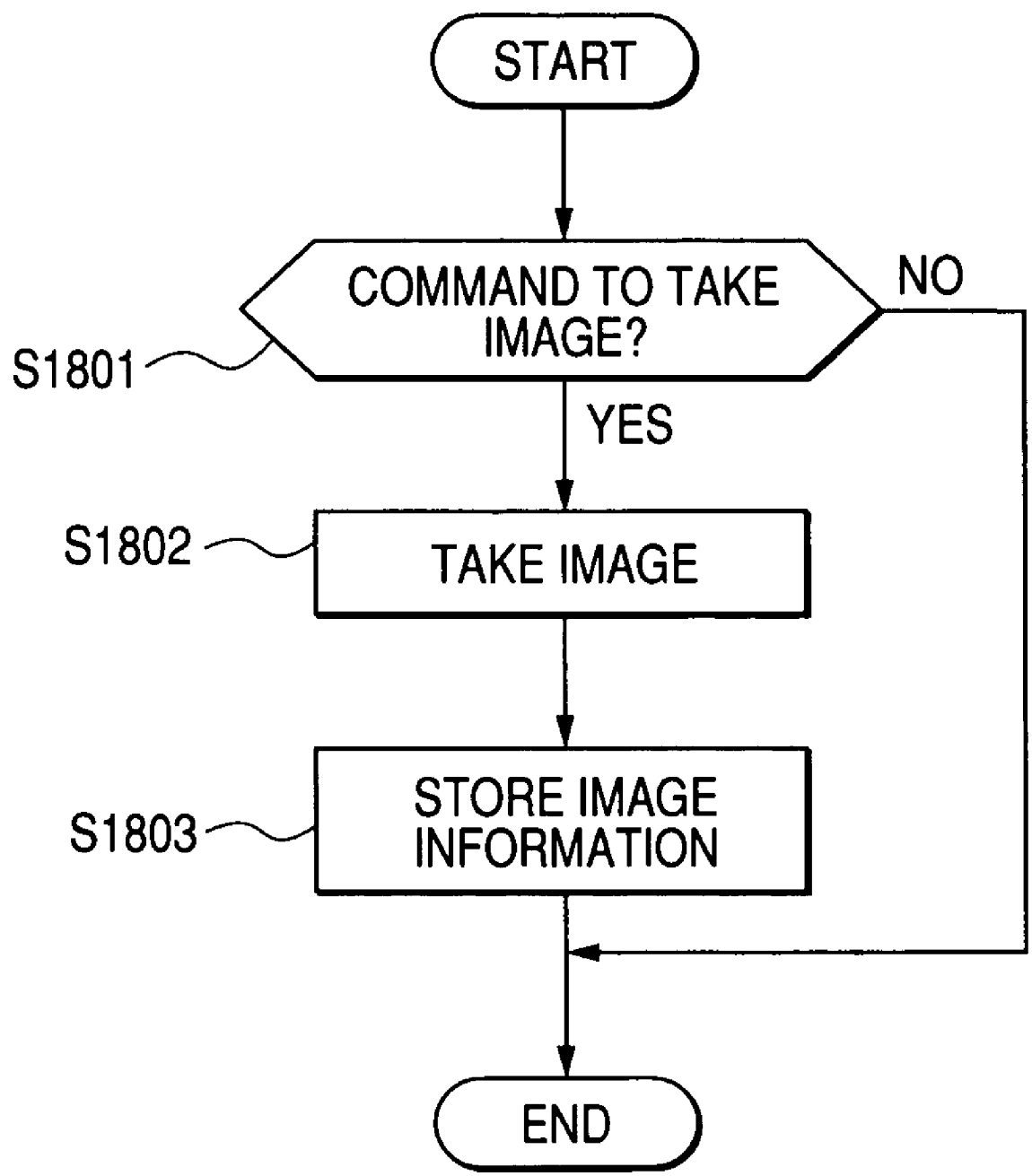
FIG. 18 is a flowchart that shows processing of control commands in an operational algorithm of an image-taking control apparatus according to an embodiment of this invention.

FIG. 18 is a flowchart that shows control command processing in an operational algorithm of the image-taking control apparatus 11. This flowchart corresponds with the step S1105 of FIG. 11. In the case of the image display example shown in FIG. 17, the user operates the user interface of the Web browser of the communication terminal to send a control command to the image-taking control apparatus. The Web browser screen 1701 has a take image button 1703, and the user of the communication terminal operates the take image button 1703 by use of a pointing device or a key that is assigned to the take image button.

First, in step S1801; the control unit 205 determines whether or not a command to take an image was received from a communication terminal that is connected to the Web server. In the case of the image display example shown in FIG. 17, when the take image button 1702 is put into an ON state, a command to take an image is sent to the image-taking control apparatus. When a command to take an image was received the operation proceeds to step S1802 and processing is continued, and when a command to take an image was not received the processing is terminated.

In step S1802, an image is taken by the image-taking unit 202 and the image information is transferred to the RAM 204.

Next, in step S1803, the image information that was transferred to the RAM 204 is stored in the image storage unit 207 by the storage control unit 208.

Figure 19:
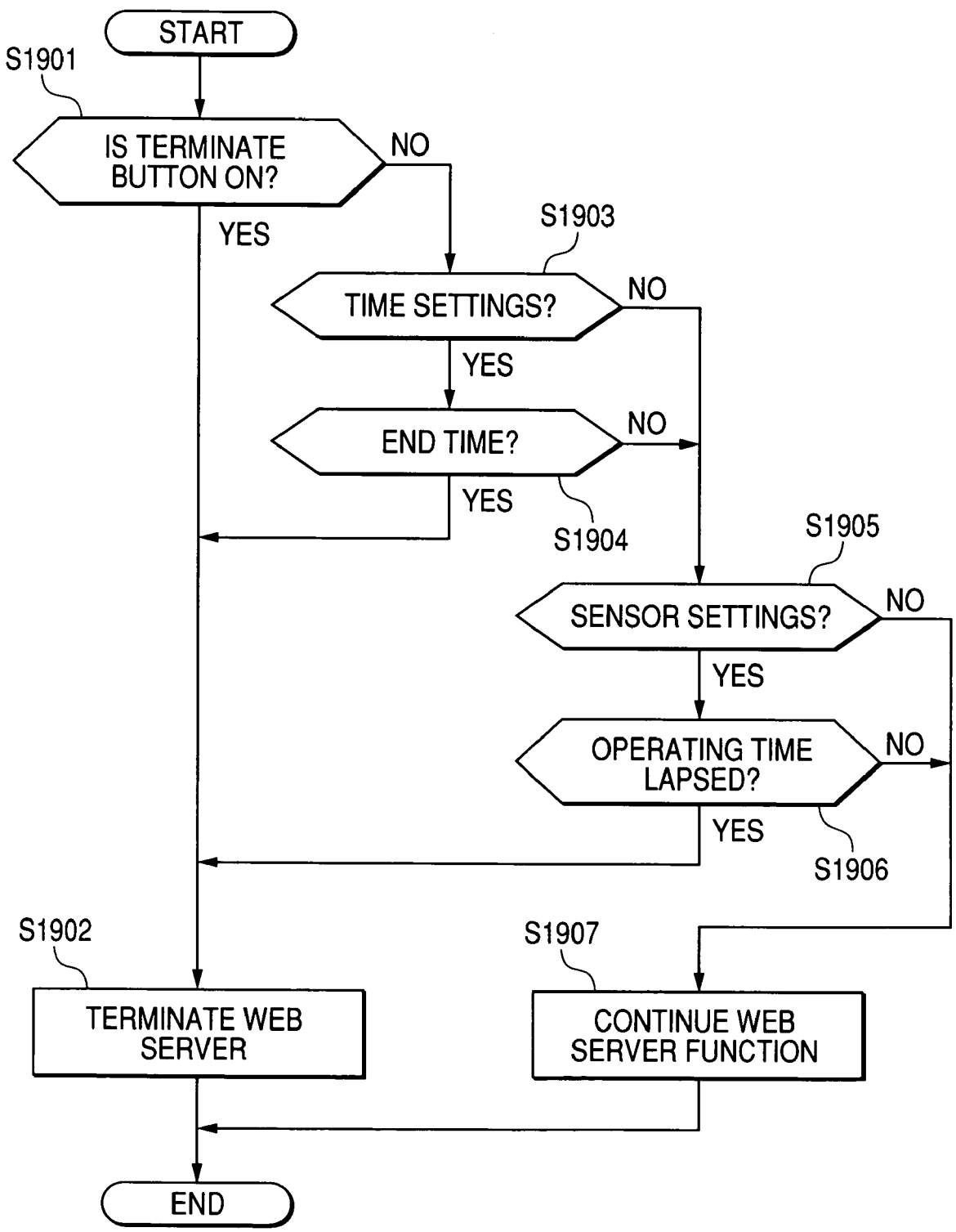
FIG. 19 is a flowchart that shows a decision to terminate a Web server in an operational algorithm of an image-taking control apparatus according to an embodiment of this invention.

FIG. 19 is a flowchart that shows a decision to terminate a Web server in an operational algorithm of the image-taking control apparatus 11. This flowchart corresponds with the step S1106 of FIG. 11.

First, in step S1901, the control unit 205 determines whether or not the terminate button 708 to terminate the Web server function was pressed on the user interface 206. When the control unit 205 determines that the terminate button 708 was pressed, the operation proceeds to step S1902 to terminate the Web server function. When the control unit 205 determines that the terminate button 708 was not pressed, the operation proceeds to step S1903 and processing is continued.

In step S1903, the control unit 205 determines whether or not "yes" is set for "time settings" of the "Web server setting" 601 of the setting information. When "yes" is set for "time settings" the operation proceeds to step S1904, and when "no" is set for "time settings" the operation proceeds to step S1905, and processing is continued.

In step S1904, the control unit 205 determines whether or not the current time is the time set in "time settings end time" of the "Web server settings" 601. When the current time is the "time settings end time" the operation proceeds to step S1902 to terminate the Web server function. When the current time is not the "time settings end time" the operation proceeds to step S1905 and the processing is continued.

In step S1905, the control unit 205 determines whether or not "yes" is set for "sensor settings" of the "Web server settings" 601 of the setting information. When "yes" is set for "sensor settings" the operation proceeds to step S1906 and the processing is continued. When "no" is set for "sensor settings" the operation proceeds to step S1907 to continue the Web server function.

In step S1906, the control unit 205 determines whether or not the time set in "sensor settings operating time" of the "Web server settings" 601 of the setting information has lapsed. When the "sensor settings operating time" has lapsed the operation proceeds to step S1902 to terminate the Web server function. When the "sensor settings operating time" has not lapsed the operation proceeds to step S1907 to continue the Web server function.

Figure 21:
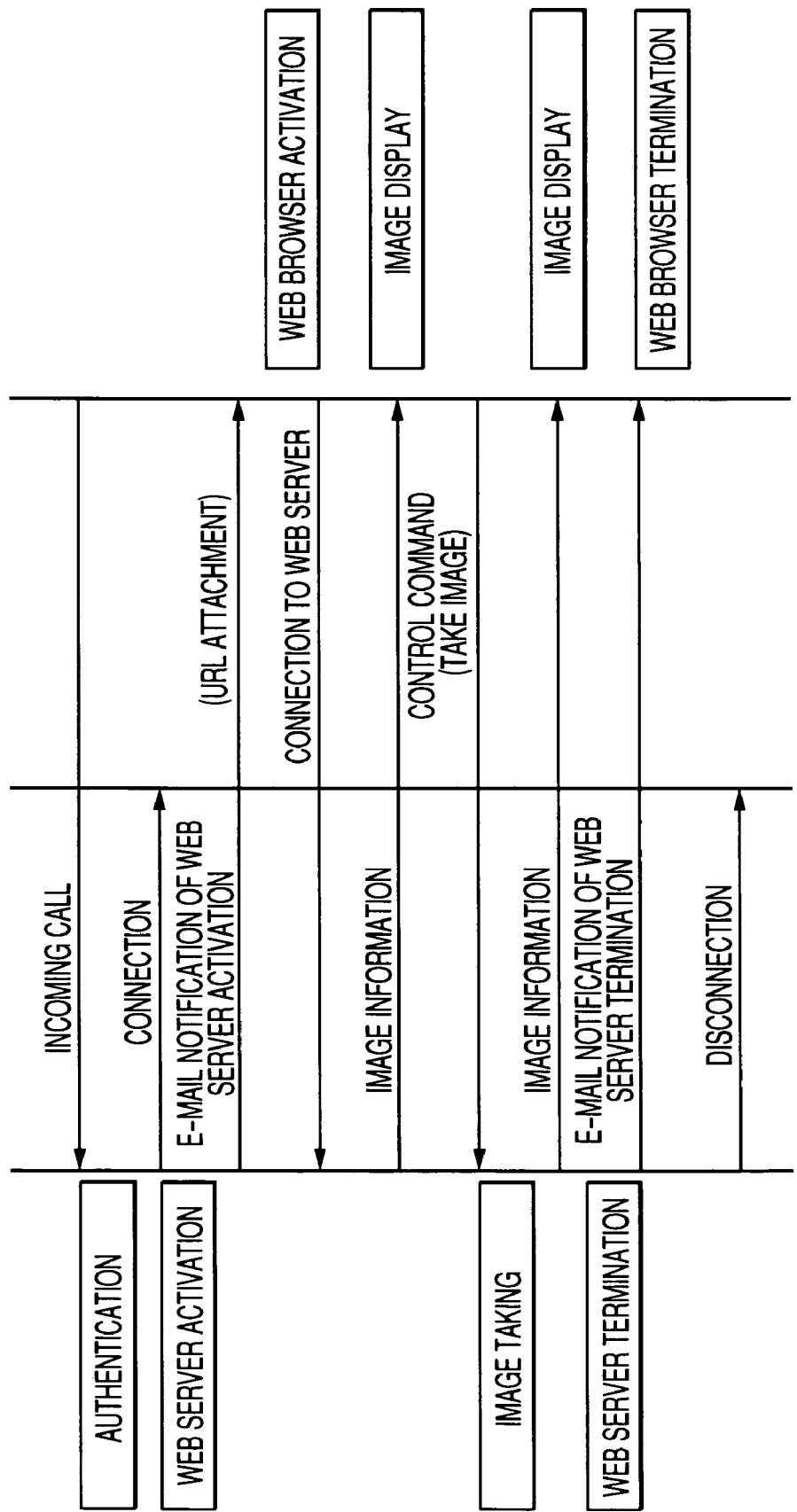
FIG. 21 is a view showing a system configuration that is used by an image-taking control apparatus with a communication function according to an embodiment of this invention, as well as the sequence of operations thereof.

It is also possible to perform authentication by means of a telephone call from the communication terminal 13 to the image-taking control apparatus 11. FIG. 21 is a view showing the sequence of operations that include the image-taking control apparatus 11 and the communication terminal 13 in this case.

In this embodiment, the image-taking control apparatus 11 has a communication function and a Web server function. When the communication terminal 13 makes a phone call to the image-taking control apparatus 11, authentication is performed at the image-taking control apparatus 11 based on the calling party number. When authentication is granted, the Web server function is activated in the image-taking control apparatus 11, and an electronic mail notification of activation of the Web server function that includes the URL of the image-taking control apparatus 11 is transmitted to the communication terminal 13 via the public network and Internet 12. The sequence of operations thereafter is the same as that in the embodiment described above, and description thereof is thus omitted here.

Figures 22, 23:
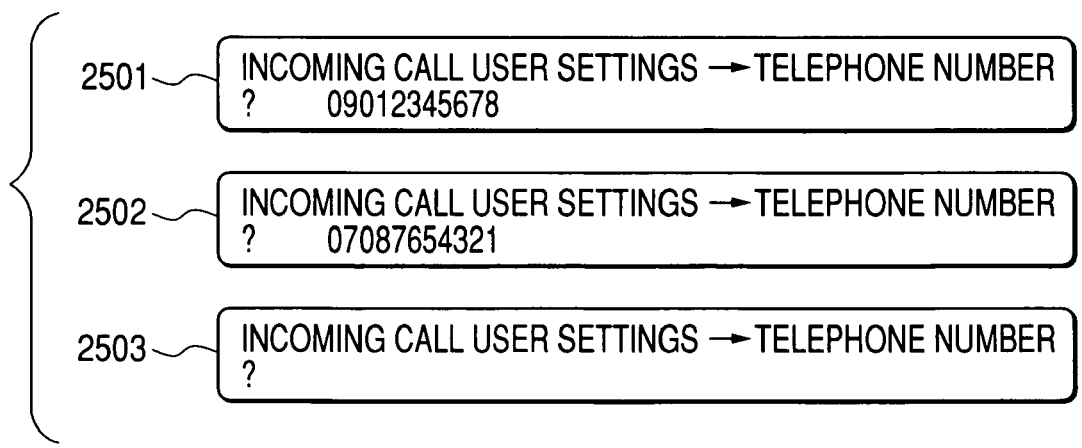
FIG. 22 is a view showing examples of setting information that is stored in a setting storage unit of an image-taking control apparatus according to an embodiment of this invention.
FIG. 23 is a view showing examples of a display that is displayed in a display unit when a setting value is entered through a user interface in an image-taking control apparatus according to an embodiment of this invention.

FIG. 22 is a view showing examples of setting information for the "incoming call user settings" 2202 that is stored in the setting storage unit 201 of the image-taking control apparatus for conducting authentication based on the calling party number.

As the setting value of "telephone number" for the setting item "incoming call user settings" 2202, the telephone number of a communication terminal that is authorized for authentication based on the calling party number when an incoming call is received is set. A plurality of values can be set as setting values for "telephone number".

FIG. 23 is a view showing display examples of a settings screen that is displayed on the display unit 701 when entering a setting value for the "incoming call user settings" of the setting information using the user interface 206 of the image-taking control apparatus 11.

First, a settings screen 2501 for "telephone number" of the "incoming call user settings" is displayed to enter a telephone number that is authorized for authentication of incoming calls based on the calling party number using the entry keys for numerals, alphabetic characters and symbols 706, and the entered telephone number is then set using the setting key 703. Next, a settings screen 2502 is displayed.

In the settings screen 2502, an example is displayed for a case in which a plurality of telephone numbers is set for "telephone number" of the "incoming call user settings". Similarly to the settings screen 2501, a telephone number that is authorized for authentication of incoming calls based on the calling party number is entered using the entry keys for numerals, alphabetic characters and symbols 706, and the entered telephone number is then set using the setting key 703. Next, a settings screen 2503 is displayed.

Termination of the setting of "telephone number" of the "incoming call user settings" is conducted by pressing the setting key 703 in a state where no telephone number has been entered, as shown in the settings screen 2503. Thus, the setting of the "incoming call user settings" terminates and the display returns to the settings screen 2305.

Figure 24:
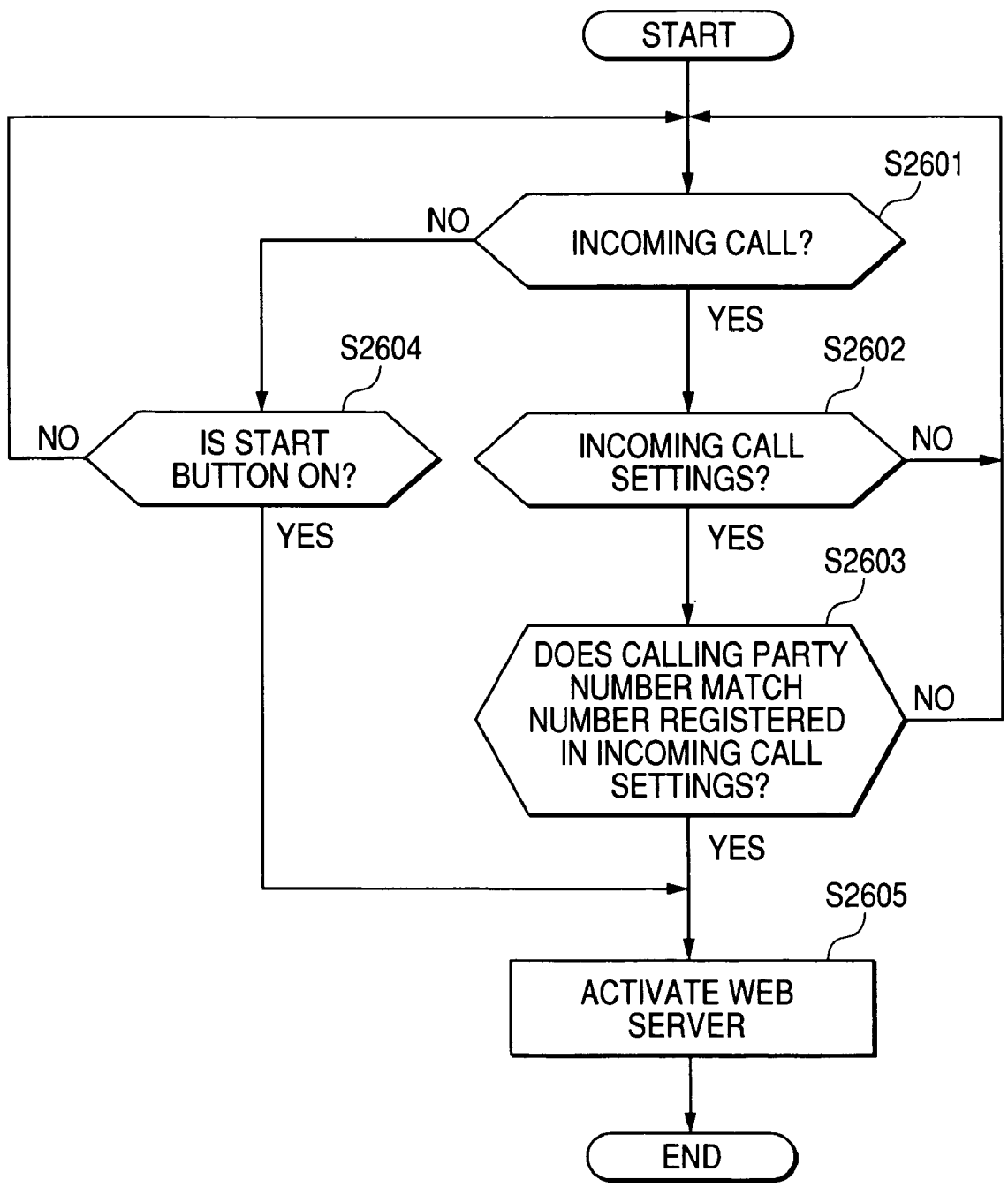
FIG. 24 is a flowchart that shows activation of a Web server in an operational algorithm of an image-taking control apparatus according to an embodiment of this invention.

FIG. 24 is a flowchart that shows activation of the Web server function that is executed by the control unit 205 when an incoming call from the communication terminal 13 is received by the image-taking control apparatus 11. This flowchart corresponds with the step S1101 of FIG. 11. In the flowchart of FIG. 24, processing for activation of the Web server function based on time settings and for activation of the Web server function based on a sensor being in an ON state is omitted since this processing is described above.

First, in step S2601, the control unit 205 determines whether or not there is an incoming call from the communication terminal 13 to the image-taking control apparatus 11. When there is an incoming call the operation proceeds to step S2602, and when there is no incoming call the operation proceeds to step S2604, and the processing is continued.

In step S2602, the control unit 205 determines whether or not "yes" is set for the "incoming call settings" of the "Web server settings" 2201 of the setting information. When "yes" is set for the "incoming call settings" the operation proceeds to step S2603, and when "no" is set for the "incoming call settings" the operation proceeds to step S2601, and the processing is continued.

Next, in step S2603, the control unit 205 determines whether or not the calling party number of the communication terminal 13 that is calling the image-taking control apparatus 11 matches a number that is registered in "telephone number" of the "incoming call user settings" 2202. When the control unit 205 determines that the calling party number matches a number registered in "telephone number" of the "incoming call user settings" 2202, the control unit 205 stores the current time in order to determine when the "incoming call settings operating time" of the "Web server settings" 2201 lapses, and the operation then proceeds to step S2605. In contrast, when the control unit 205 determines that the calling party number does not match a number registered in "telephone number" of the "incoming call user settings" 2202, the operation proceeds to step S2601 and processing is continued.

Meanwhile, in step S2604, the control unit 205 determines whether or not the start button 707 of the user interface 206 was pressed. When the control unit 205 determines that the start button was pressed the operation proceeds to step S2605, and when the control unit 205 determines that the start button was not pressed the operation proceeds to step S2601, and processing is continued.

In step S2605, the control unit 205 activates the function of the Web server. Thus, the communication terminal can access the Web server through the public network and Internet 12.

FIG. 25 is a flowchart that shows a decision to terminate the Web server function in a case where the Web server was activated by an incoming call from the communication terminal 13 to the image-taking control apparatus 11. This flowchart corresponds with the step S1106 of FIG. 11. In the flowchart of FIG. 25, processing for a decision to terminate the Web server function when the Web server function was activated by time settings or when the Web server function was activated by the sensor being in an ON state is omitted since this processing is described above.

First, in step S2701, the control unit 205 determines whether or not the terminate button 708 of the user interface 206 was pressed to terminate the Web server function. When the control unit 205 determines that the terminate button 708 was pressed the operation proceeds to step S2702, where it is decided to terminate the Web server function and processing is thus terminated. When the control unit 205 determines that the terminate button 708 was not pressed the operation proceeds to step S2703 and processing is continued.

Next, in step S2703, the control unit 205 determines whether or not "yes" is set for "incoming call settings" of the "Web server settings" 2201 of the setting information. When "yes" is set for "incoming call settings" the operation proceeds to step S2704 and processing is continued. When "no" is set for "incoming call settings" the operation proceeds to step S2705, where it is decided to continue the Web server function and processing is thus terminated.

Subsequently, in step S2704, the control unit 205 determines whether or not the "incoming call settings operating time" of the "Web server settings" 2201 of the setting information has lapsed. When the "incoming call settings operating time" has lapsed the operation proceeds to step S2702 to terminate the Web server function. When the "incoming call settings operating time" has not lapsed the operation proceeds to step S2705, where it is decided to continue the Web server function.

Figure 27:
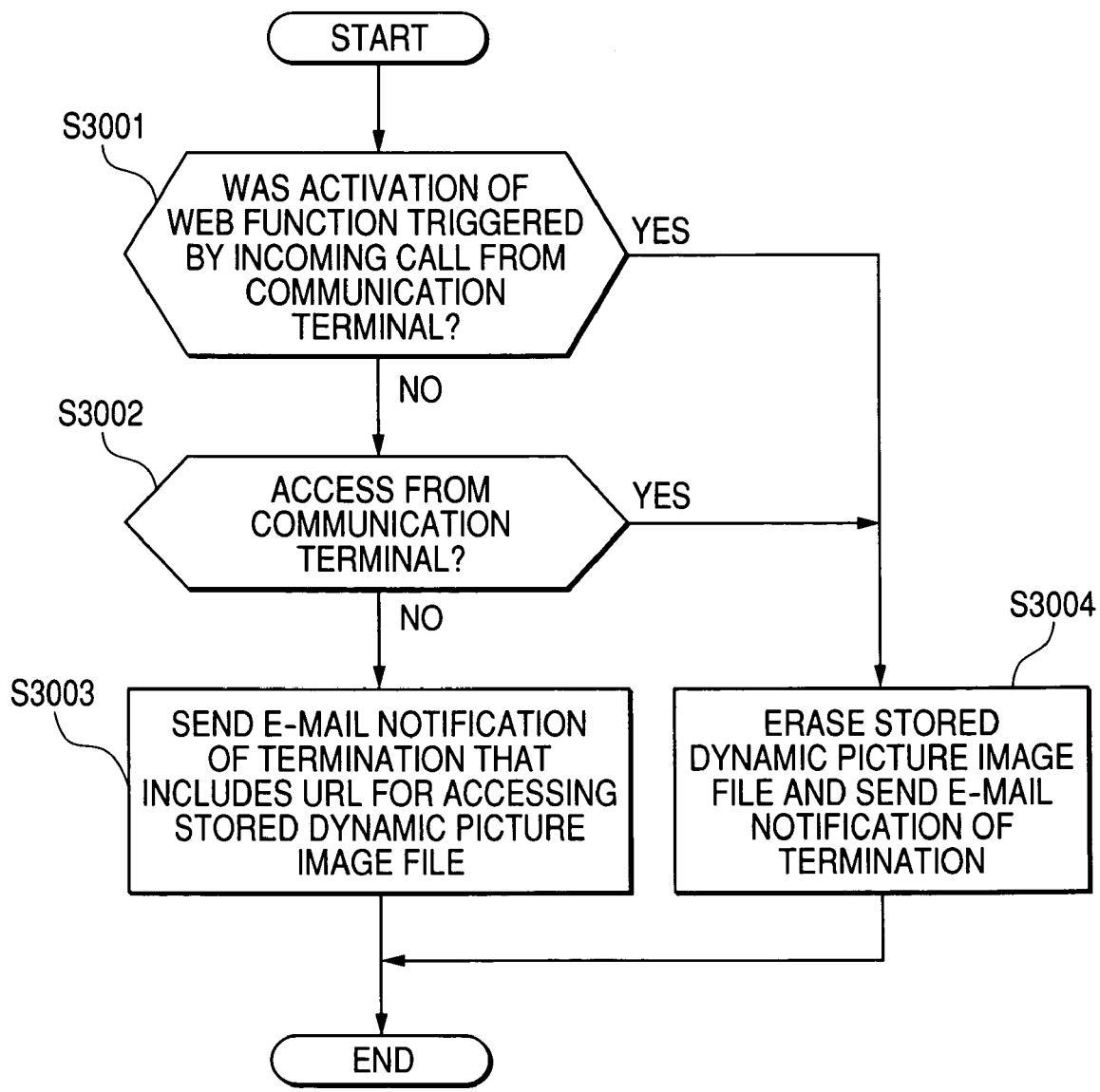
FIG. 27 is a flowchart of the processing carried out when terminating a Web server in an operational algorithm of an image-taking control apparatus according to an embodiment of this invention.

FIG. 27 is a flowchart of the processing operations of the image-taking control apparatus 11 that shows processing performed to transmit a notification of termination to the communication terminal 13 by electronic mail when terminating the Web server function of the image-taking control apparatus 11. This flowchart corresponds with the step S1107 of FIG. 11.

First, in step S3001, the control unit 205 determines whether or not activation of the Web server function of the image-taking control apparatus 11 was triggered by a transmission through a telephone line from the communication terminal 13. When the control unit 205 determines that the activation was triggered by a transmission through a telephone line from the communication terminal 13 the operation proceeds to step S3004.

In contrast, when the control unit 205 determines that the activation of the Web server function was not triggered by a transmission through a telephone line from the communication terminal 13 the operation proceeds to step S3002. As conditions for proceeding to step S3002, a condition whereby a timer reaches a Web function start time or an abnormality or the like is detected by a sensor can be considered.

In step S3002, the control unit 205 determines whether or not there was an access from the communication terminal 13 during the operation of the Web server. When there was an access from the communication terminal 13 the operation proceeds to step S3004. When there was no access from the communication terminal 13 the operation proceeds to step S3003.

In step S3003, the control unit 205 transmits to the communication terminal 13 an electronic mail that notifies the communication terminal 13 that operation of the Web server function is being terminated and also includes a URL for accessing the storage destination of dynamic images that were taken when the Web server function was operating. This processing is performed to overcome a problem arising from the fact that the communication terminal 13 that should have accessed the image-taking control apparatus 11 did not access the image-taking control apparatus 11. In this connection, for an embodiment in which dynamic images were stored in the storage unit 207 of the image-taking control apparatus 11, processing is executed to add a description indicating the time of the next activation of the Web server function to the electronic mail, as shown in an electronic mail text 2003 of FIG. 20. In contrast, for an embodiment in which dynamic images were transferred to an apparatus (not shown in the figures) for which a Web server function is always active to be stored in a storage unit thereof, it is not necessary to include a description indicating the next time the Web server function will be activated in the electronic mail, as shown in an electronic mail text 2004 of FIG. 20.

In step S3004, the control unit 205 erases a dynamic image stored in the storage unit 207 of the image-taking control apparatus 11. This operation is conducted because it was decided in step S3001 or step S3002 that the communication terminal 13 accessed the image-taking control apparatus and already acquired a live dynamic image that was taken at the image-taking control apparatus 11. Thus, it is possible to reduce the storage capacity of the storage unit 207.

Other Embodiments

The setting items that are set for an image-taking control apparatus according to an embodiment of this invention are not limited to the items used in the foregoing embodiments and, for example, a setting may be added that activates a Web server in a case where a voice input function such as a microphone or the like is added to an image-taking unit and a sound is input as a trigger to activate the Web server function.

Further, when the configuration of the image-taking control apparatus contains a control mechanism for pan or tilt, a control command that is sent from the communication terminal 13 to the image-taking control apparatus 11 may be a command for pan or tilt control, and when the image-taking unit of the image-taking control apparatus has a zoom function the control command may be a command for zoom control.

The settings screens for the setting information that are shown in FIG. 8, FIG. 9, FIG. 10, and FIG. 23 are examples of settings screens, and a settings screen is not limited to these examples and may be any screen that allows a setting value to be set for the setting information.

In the processing of the embodiment described above, authentication of a call from a communication terminal to an image-taking control apparatus with a communication function was performed by the control unit 205 based on the calling party number in accordance with a setting value for the "incoming call user settings" 2202 shown in FIG. 22, however authentication of an incoming call may also be conducted using setting information that includes a "subaddress" setting value for an "incoming call user settings" setting item as shown in FIG. 26. In this embodiment, in the case of an "incoming call user settings" 2801, authentication is granted when a calling party subaddress that is sent from a communication terminal matches a setting value. In the case of an "incoming call user settings" 2802, authentication is granted when a called party subaddress that is sent from a communication terminal matches a setting value. In the case of an "incoming call user settings" 2803, authentication is granted when each of a calling party subaddress and a called party subaddress that are sent from the communication terminal 13 match with their respective setting values. In the case of an "incoming call user settings" 2804, authentication is granted when either a calling party subaddress or a called party subaddress that is sent from a communication terminal matches with a setting value. For a call made from a communication terminal to an image-taking control apparatus with a communication function using a communication medium that includes a subaddress information element for call establishment such as ISDN or PHS, the subaddress can be used for authentication of the incoming call. Authentication that combines the calling party number and subaddress is also possible.

Further, a transmission capability that is required for call establishment for a call from a communication terminal to an image-taking control apparatus with a communication function is not limited to data communication, and voice communication can also be used. More specifically, an incoming call can be authenticated at an image-taking control apparatus with a communication function by data communication or voice communication from a communication terminal.

In addition, setting of setting information is not limited to settings performed from a user interface of the image-taking control apparatus and, for example, setting may be conducted by installing a software for entering setting values of setting information into a PC or an information device to allow a user to enter the setting values, and then connecting the PC or the information device and the image-taking control apparatus to transfer to the image-taking control apparatus the setting information for which the entry of setting values has thus been completed. The connection of the PC or the information device and the image-taking control apparatus in this case can be executed by mounting on the PC or the information device and the image-taking control apparatus a communication interface for RS-232C, USB, parallel, Bluetooth, wired LAN, wireless LAN or any other communications standard that connects information devices.

Further, the setting of setting information is not limited to settings performed from a user interface of the image-taking control apparatus and, for example, the setting may be conducted by providing a service for entering setting values for the setting information on a website on the Internet to allow a user to enter setting values using a Web browser, and then connecting the website on the Internet to the image-taking control apparatus via a communications network to transfer the setting information for which the entry of setting values has thus been completed to the image-taking control apparatus from the Internet website.

This application claims priority from Japanese Patent Application No. 2004-045322 filed Feb. 20, 2004, and Japanese Patent Application No. 2004-167543 filed Jun. 4, 2004, which are hereby incorporated by reference herein.

What is claimed is:

1. An image-taking control apparatus for transmitting an image taken by an image-taking device to a communication terminal via the Internet, comprising:

a settings memory for storing a preset address of a communication terminal, activation conditions for a function of a Web server for conducting communication with the communication terminal, and termination conditions for a function of the Web server;

a control device for, when the activation conditions are satisfied, activating the function of the Web server for conducting communication with the communication terminal, and creating contents of a first electronic mail which contains a message notifying a receiving party that the function of the Web server has been activated and a URL for accessing the image-taking control apparatus and which is for transmission to the address of the communication terminal, transmitting a live image taken by the image-taking device to the communication terminal on condition that it is recognized that the communication terminal accesses the image-taking control apparatus through the function of the Web server, and, on condition that the termination conditions are satisfied, terminating the function of the Web server and creating contents of a second electronic mail which contains a message notifying a receiving party that the function of the Web server has been terminated and which is for transmission to the address of the communication terminal; and a communication device for transmitting the first electronic mail in response to activation of the function of the Web server, transmitting a live image taken by the image-taking device to the communication terminal via the Internet in response to an access by the communication terminal, and transmitting the second electronic mail in response to termination of the function of the Web server.

2. The image-taking control apparatus according to claim 1, wherein the control device determines whether or not the communication terminal accessed the image-taking control apparatus during activation of the Web server, and when the communication terminal doesn't access the image-taking control apparatus during activation of the Web server, creates the second electronic mail to include a URL that indicates a storage destination of an image that is taken by the image-taking device while the Web server is activated.

3. The image-taking control apparatus according to claim 2, wherein the control device, when the storage destination of an image is a memory inside the image-taking control apparatus, creates the second electronic mail to also include a description indicating a time the Web server function is next activated.

4. The image-taking control apparatus according to claim 1, wherein the control device determines whether or not the communication terminal accesses the image-taking control apparatus during activation of the Web server, and when the communication terminal accesses the image-taking control apparatus during activation of the Web server, the control device erases from a memory an image that is taken by the image-taking device while the Web server is activated.

5. A control method of an image-taking control apparatus for transmitting an image taken by an image-taking device to a communication terminal via the Internet, having the following steps:
   a setting step for setting an address of a communication terminal, conditions for activating a function of a Web server for conducting communication with the communication terminal, and conditions for terminating the function of the Web server;
   a first electronic mail creation step for, when the activation conditions are satisfied, activating the function of the Web server for conducting communication with the communication terminal, and creating contents of a first electronic mail which contains a message notifying a receiving party that the function of the Web server has been activated and a URL for accessing the image-taking control apparatus and which is for transmission to the address of the communication terminal;
   a first electronic mail transmission step for transmitting the first electronic mail in response to activation of the function of the Web server;
   an image transmission step for, on condition that it is recognized that the communication terminal access to the image-taking control apparatus through the function of the Web server, transmitting a live image taken by the image-taking device to the communication terminal in response to the access by the communication terminal;
   a second electronic mail creation step for, when the termination conditions are satisfied, terminating the function of the Web server and creating contents of a second electronic mail which contains a message notifying a receiving party that the function of the Web server has been terminated and is for transmission to the address of the communication terminal; and
   a second electronic mail transmission step for transmitting the second electronic mail in response to termination of the function of the Web server.

6. The control method of an image-taking control apparatus according to claim 5, wherein in the second electronic mail creation step, a control device determines whether or not the communication terminal accesses the image-taking control apparatus during activation of the Web server, and when the communication terminal does not access the image-taking control apparatus during activation of the Web server, the control device creates the second electronic mail to include a URL that indicates a storage destination of an image that is taken by the image-taking device while the Web server is activated.

7. The control method of an image-taking control apparatus according to claim 6, wherein in the second electronic mail creation step, when a storage destination of the image is a memory inside the image-taking control apparatus, the control device creates the second electronic mail to also include a description indicating a time the Web server function is next activated.

8. The control method of an image-taking control apparatus according to claim 5, wherein in the second electronic mail creation step, a control device determines whether or not the communication terminal accesses the image-taking control apparatus during activation of the Web server, and when the communication terminal accesses the image-taking control apparatus during activation of the Web server, the control device erases from a memory an image that is taken by the image-taking device while the Web server is activated.

9. A program for executing a control method of an image-taking control apparatus for transmitting an image taken by an image-taking device to a communication terminal via the Internet, wherein the program executes the following steps:
   a setting step for setting an address of a communication terminal, conditions for activating a function of a Web server for conducting communication with the communication terminal, and conditions for terminating the function of the Web server;
   a first electronic mail creation step for, when the activation conditions are satisfied, activating the function of the Web server for conducting communication with the communication terminal, and creating contents of a first electronic mail which contains a message notifying a receiving party that the function of the Web server has been activated and a URL for accessing the image-taking control apparatus and which is for transmission to the address of the communication terminal;
   a first electronic mail transmission step for transmitting the first electronic mail to the address of the communication terminal in response to activation of the function of the Web server;
   an image transmission step for, on condition that it is recognized that the communication terminal accesses to the image-taking control apparatus through the function of the Web server, transmitting a live image taken by the image-taking device to the communication terminal in response to an access by the communication terminal;
   a second electronic mail creation step for, when the termination conditions are satisfied, terminating the function of the Web server and creating contents of a second electronic mail which contains a message notifying a receiving party that the function of the Web server is terminated and is for transmission to the address of the communication terminal; and
   a second electronic mail transmission step for transmitting the second electronic mail upon termination of the function of the Web server.

10. The program for executing a control method of an image-taking control apparatus according to claim 9, wherein in the second electronic mail creation step, a control device determines whether or not the communication terminal accesses the image-taking control apparatus during activation of the Web server, and when the communication terminal does not access the image-taking control apparatus during activation of the Web server, the control device creates the second electronic mail to include a URL that indicates a storage destination of an image that is taken by the image-taking device while the Web server is activated.

11. The program for executing a control method of an image-taking control apparatus according to claim 10, wherein in the second electronic mail creation step, when a storage destination of the image is a memory inside the image-taking control apparatus, the control device creates the second electronic mail to also include a description indicating a time the Web server function will be next activated.

12. The program for executing a control method of an image-taking control apparatus according to claim 9, wherein in the second electronic mail creation step, a control device determines whether or not the communication terminal accesses the image-taking control apparatus during activation of the Web server, and when the communication terminal accesses the image-taking control apparatus during activation of the Web server, the control device erases from a memory an image that is taken by the image-taking device while the Web server is activated.

* * * * *